(12) United States Patent
Goto et al.

(10) Patent No.: US 10,719,746 B2
(45) Date of Patent: Jul. 21, 2020

(54) PRINTING APPARATUS, PRINTING METHOD, AND STORAGE MEDIUM

(71) Applicant: CANON KABUSHIKI KAISHA, Tokyo (JP)

(72) Inventors: Fumitaka Goto, Tokyo (JP); Hiromitsu Yamaguchi, Yokohama (JP); Yuto Kajiwara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/202,800

(22) Filed: Nov. 28, 2018

(65) Prior Publication Data

US 2019/0171917 A1 Jun. 6, 2019

(30) Foreign Application Priority Data

Dec. 5, 2017 (JP) .................................. 2017-233541

(51) Int. Cl.
| | |
|---|---|
| *G06K 15/10* | (2006.01) |
| *B41J 2/21* | (2006.01) |
| *B41J 2/145* | (2006.01) |
| *B41J 19/14* | (2006.01) |
| *B41J 2/205* | (2006.01) |

(52) U.S. Cl.
CPC ............ *G06K 15/107* (2013.01); *B41J 2/145* (2013.01); *B41J 2/2054* (2013.01); *B41J 2/2132* (2013.01); *B41J 19/142* (2013.01); *G06K 2215/0094* (2013.01)

(58) Field of Classification Search
CPC ...... B41J 2/2114; B41J 2/2052; B41J 2/2054; B41J 19/142
See application file for complete search history.

(56) References Cited

U.S. PATENT DOCUMENTS

| | | | |
|---|---|---|---|
| 6,270,185 B1* | 8/2001 | Askeland | B41J 2/15 347/40 |
| 6,497,467 B2 | 12/2002 | Suwa et al. | |
| 8,714,678 B2* | 5/2014 | Konno | B41J 2/2114 347/14 |
| 8,888,204 B2* | 11/2014 | Iritani | B41J 29/38 347/6 |
| 9,227,423 B2* | 1/2016 | Yazawa | H04N 1/54 |
| 2002/0024555 A1* | 2/2002 | Fujioka | B41J 2/2132 347/41 |
| 2002/0075341 A1 | 6/2002 | Suwa et al. | |

(Continued)

FOREIGN PATENT DOCUMENTS

JP  2005-177992 A  7/2005

*Primary Examiner* — John Zimmermann
(74) *Attorney, Agent, or Firm* — Venable LLP

(57) ABSTRACT

Ink containing metal particles is ejected from a print head, in accordance with a plurality of print ratios corresponding to a plurality of scans of the print head relative to a unit region of a print medium. At least one of the plurality of print ratios is set as a high print ratio which is higher than others. A height of the high print ratio, in a case where a scan corresponding to the high print ratio is a Lth (L: integral number) scan in the plurality of print scans, is higher than a height of the high print ratio, in a case where a scan corresponding to the high print ratio is a Nth (N>L; N: integral number) scan in the plurality of print scans.

14 Claims, 19 Drawing Sheets

(56) References Cited

U.S. PATENT DOCUMENTS

| | | | |
|---|---|---|---|
| 2003/0197756 A1* | 10/2003 | Inoue | B41J 2/1404 347/40 |
| 2011/0221814 A1* | 9/2011 | Tamai | B41J 2/2054 347/14 |
| 2013/0084439 A1* | 4/2013 | Ojiro | B41J 2/2114 428/195.1 |
| 2013/0106943 A1* | 5/2013 | Kagata | B41J 2/015 347/20 |
| 2019/0016123 A1 | 1/2019 | Yamaguchi et al. | |

* cited by examiner

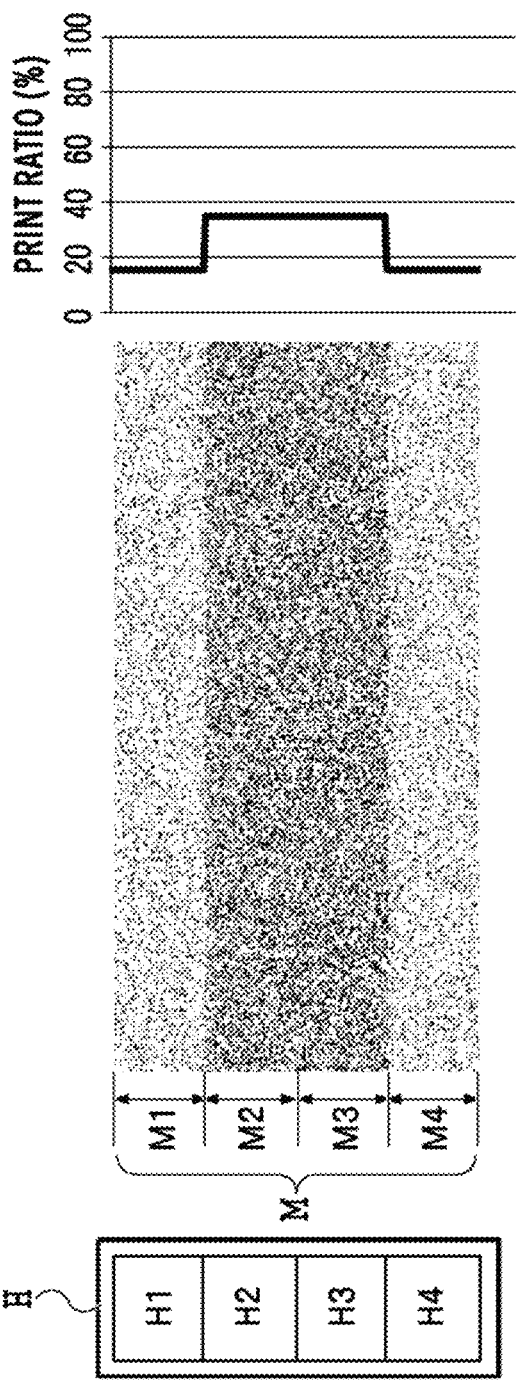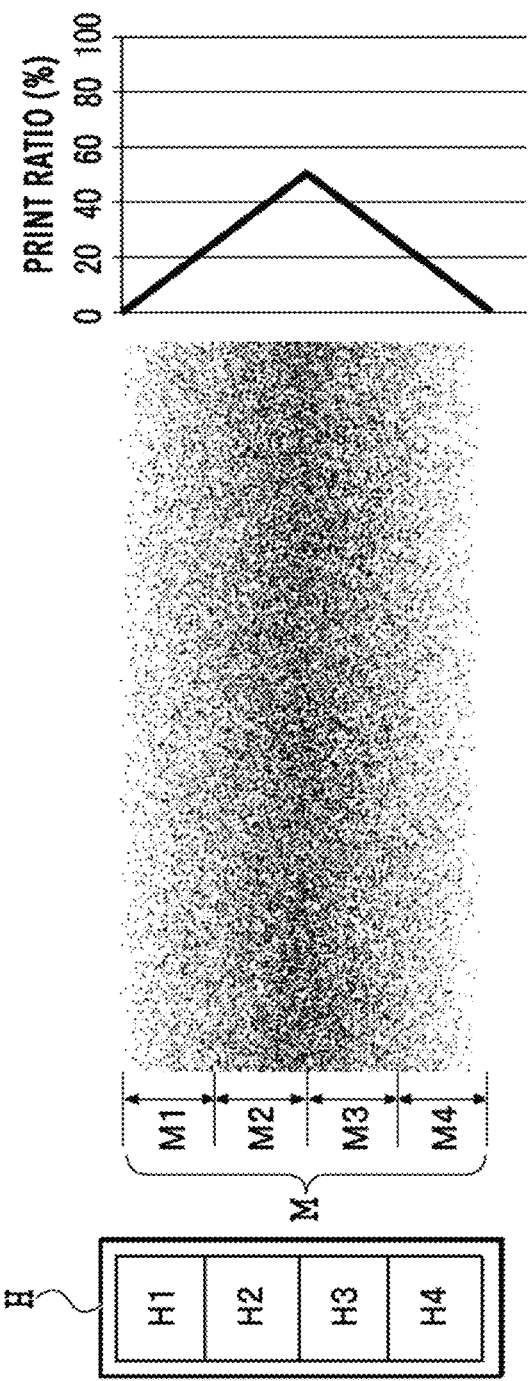

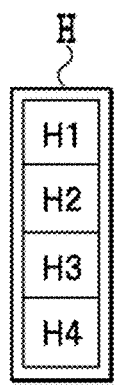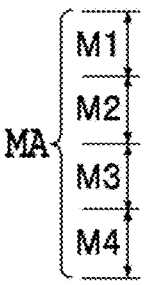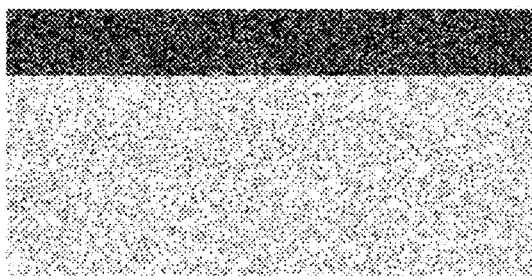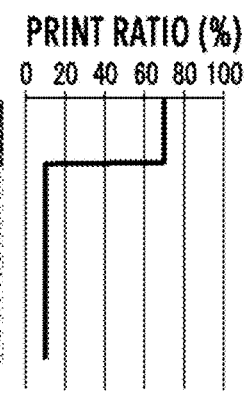
FIG.11A
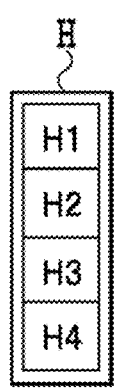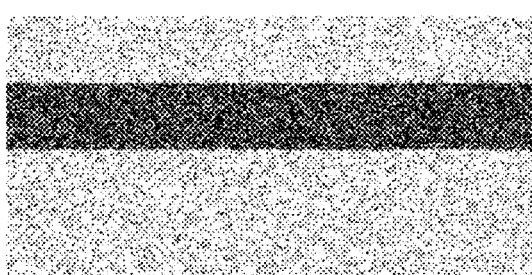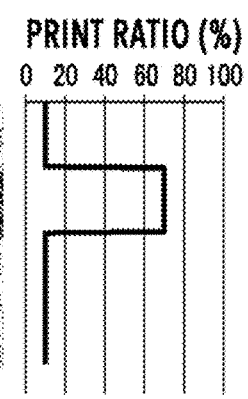
FIG.11B
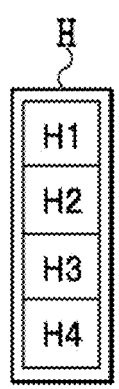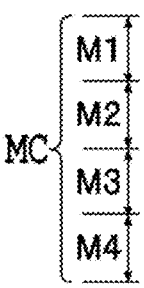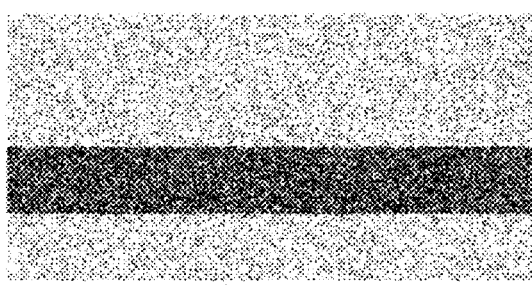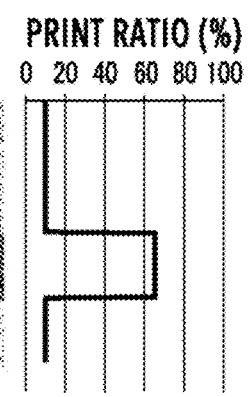
FIG.11C
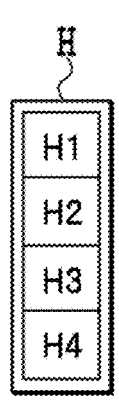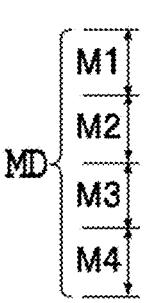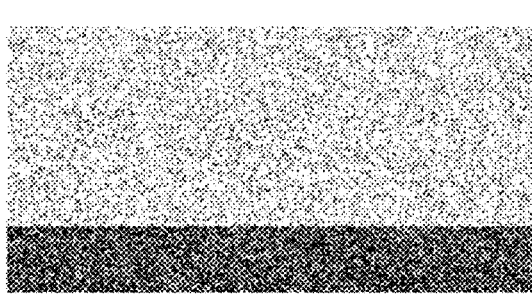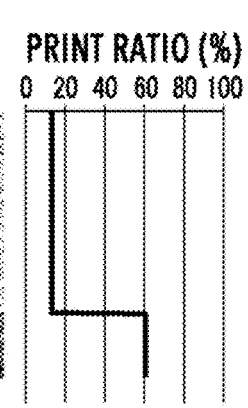
FIG.11D

|  | PRINT MEDIUM A | | | | ... | PRINT MEDIUM B | | | | ... |
|---|---|---|---|---|---|---|---|---|---|---|
|  | PRINT QUALITY A | | PRINT QUALITY B | | | PRINT QUALITY A | | PRINT QUALITY B | | |
|  | NUMBER OF USES | FLAG | NUMBER OF USES | FLAG | ... | NUMBER OF USES | FLAG | NUMBER OF USES | FLAG | ... |
| PASS MASK A | 51 |  | 99 | * | ... | 22 |  | 36 |  | ... |
| PASS MASK B | 55 |  | 108 |  | ... | 18 |  | 24 | * | ... |
| PASS MASK C | 48 | * | 103 |  | ... | 30 |  | 27 |  | ... |
| PASS MASK D | 62 |  | 115 |  | ... | 11 | * | — | — | ... |
| PASS MASK E | 53 |  | — | — | ... | — | — | — | — | ... |
| ... | ... | ... | ... | ... | ... | ... | ... | ... | ... | ... |

FIG.19

PRINTING APPARATUS, PRINTING METHOD, AND STORAGE MEDIUM

BACKGROUND OF THE INVENTION

Field of the Invention

The present invention relates to a printing apparatus and a printing method that use ink containing metal particles, and a storage medium for realizing the printing method.

Description of the Related Art

Generally, an inkjet printing apparatus based on multi-pass printing causes a print head to scan a predetermined print region of a print medium for a plurality of times and, in each scan, prints an image using a different range of a nozzle row in the print head.

Japanese Patent Laid-Open No. 2005-177992 describes a method that varies the print ratio for each of a plurality of print scans in an inkjet printing apparatus as described above. Specifically, the method reduces the print ratio of the print scan that uses a nozzle at the end of the nozzle row, and increases the print ratio of the print scan that uses a nozzle at the central part of the nozzle row so as to reduce image defects caused by deviation of ink ejected from the nozzle at the end of the nozzle row. Additionally, the method changes the order of print scans with a high print ratio for a plurality of print scans performed on different print regions on the print medium so as to extend the life of the print head by keeping the difference small between the use ratios of nozzles.

SUMMARY OF THE INVENTION

Using ink containing particles that exhibit metallic luster, for example, as ink containing metal particles allows for printing an image having metallic luster.

However, using the printing apparatus described in Japanese Patent Laid-Open No. 2005-177992 to print an image having metallic luster with ink containing metal particles, may generate a partial luster difference on the print image. In other words, changing the order of print scans with a high print ratio so as to keep the difference between the use ratios of nozzles small may cause a difference of the degree of unevenness on the surface of the print image between a print region in which the order of print scans with a high print ratio is early, and a print region in which the order is late. The difference of the degree of unevenness appears as a luster difference on the print image.

The present invention provides a printing apparatus, a printing method, and a storage medium that allow for printing high-quality images using ink containing metal particles in multi-pass printing, while keeping the luster difference small.

In the first aspect of the present invention, there is provided a printing apparatus comprising:

a print head configured to eject ink containing metal particles;

a scan unit configured to scan the print head in a first direction;

a conveyance unit configured to convey a print medium in a second direction intersecting with the first direction; and a control unit configured to control a print operation which causes the ink to be ejected from the print head, while causing the scan unit to scan the print head for a plurality of times relative to a unit region of the print medium, in accordance with a plurality of print ratios corresponding to the plurality of times of the scan, and a conveyance operation which conveys the print medium by the conveyance unit, wherein the control unit is configured to set at least one of the plurality of print ratios as a high print ratio which is higher than others, and a height of the high print ratio, in a case where a scan corresponding to the high print ratio is a Lth (L: integral number) scan in the plurality of print scans, is higher than a height of the high print ratio, in a case where a scan corresponding to the high print ratio is a Nth (N>L; N: integral number) scan in the plurality of print scans.

In the second aspect of the present invention, there is provided a printing method comprising the steps of:

scanning a print head for ejecting ink containing metal particles relative to a unit region of a print medium in a first direction for a plurality of times;

ejecting the ink from the print head in accordance with a plurality of print ratios corresponding to the plurality of scans;

conveying the print medium in a second direction intersecting with the first direction; and setting at least one of the plurality of print ratios as a high print ratio which is higher than others, wherein a height of the high print ratio, in a case where a scan corresponding to the high print ratio is a Lth (L: integral number) scan in the plurality of print scans, is higher than a height of the high print ratio, in a case where a scan corresponding to the high print ratio is a Nth (N>L; N: integral number) scan in the plurality of print scans.

In the third aspect of the present invention, there is provided a storage medium having stored therein a program code for performing a printing method, the method comprises the steps of:

scanning a print head for ejecting ink containing metal particles relative to a unit region of a print medium in a first direction for a plurality of times;

ejecting the ink from the print head in accordance with a plurality of print ratios corresponding to the plurality of scans;

conveying the print medium in a second direction intersecting with the first direction; and setting at least one of the plurality of print ratios as a high print ratio which is higher than others, wherein a height of the high print ratio, in a case where a scan corresponding to the high print ratio is a Lth (L: integral number) scan in the plurality of print scans, is higher than a height of the high print ratio, in a case where a scan corresponding to the high print ratio is a Nth (N>L; N: integral number) scan in the plurality of print scans.

The present invention allows for printing high-quality images using ink containing metal particles, while keeping the luster difference small by changing the height of high print ratios.

Further features of the present invention will become apparent from the following description of exemplary embodiments with reference to the attached drawings.

BRIEF DESCRIPTION OF THE DRAWINGS

FIGS. 7A and 7B are respectively explanatory diagrams of different examples of the color ink pass mask;

FIGS. 11A, 11B, 11C and 11D are explanatory diagrams of a pass mask for ink containing metal particles;

FIG. 19 is an explanatory diagram of a mask setting history.

DESCRIPTION OF THE EMBODIMENTS

Figure 1:
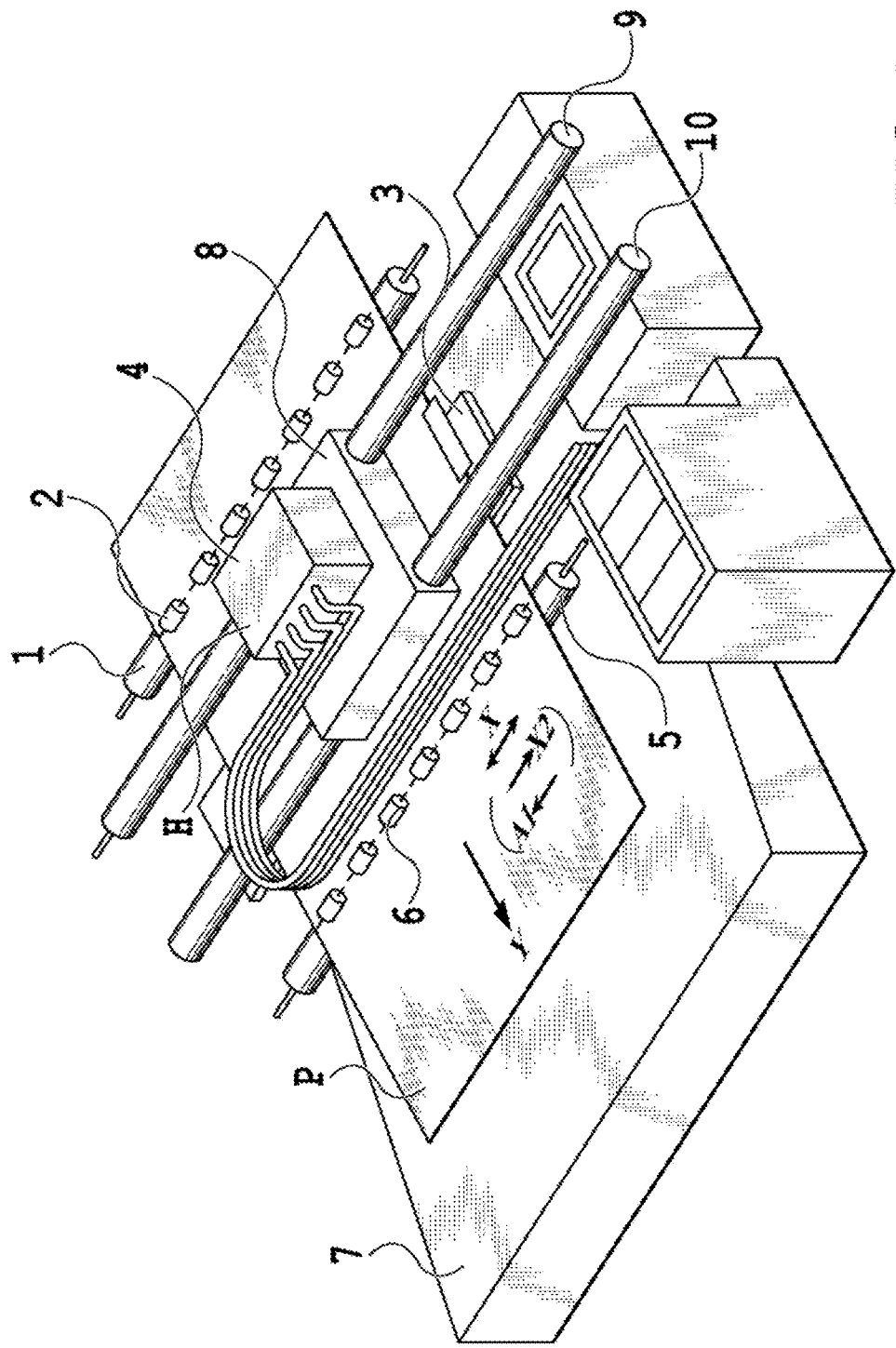
FIG. 1 is a schematic perspective view of a printing apparatus in a first embodiment of the present invention.

In the following, embodiments of the present invention will be described, referring to the drawings.

First Embodiment

FIG. 1 is a schematic perspective view of main parts of an inkjet printing apparatus in the present embodiment.

In the case where a print operation is performed, a print medium P is sandwiched between a conveyance roller 1 provided over a conveyance path and a pinch roller 2 following thereof, and conveyed in a sub-scan direction indicated by an arrow Y in accordance with rotation of conveyance roller 1, while being supported by a platen 3. The pinch roller 2 is biased toward the conveyance roller 1 by a pressing means such as a spring which is not illustrated. The platen 3 is provided at a print position facing a surface (ejection port formation surface) having formed thereon an ejection port of an inkjet print head H. The platen 3 maintains a predetermined distance between the surface of the print medium P and the ejection port formation surface of the print head H by supporting the back side of the print medium P. The print medium P subjected to printing on the platen 3 is sandwiched between a rotating discharge roller 5 and a spur 6 which is a rotating body following thereof, conveyed in the direction indicated by the arrow Y, and discharged on a discharge tray 7.

The print head H is detachably mounted on a carriage 8 so that the ejection port formation surface thereof is facing the platen 3. The carriage 8 is reciprocated together with the print head H by a scan mechanism. In other words, the carriage 8, while being guided by guide rails 9 and 10, is reciprocated by the driving force of a carriage motor or the like in the directions indicated by arrows X1 and X2 along the sub-scan direction indicated by an arrow X intersecting with (perpendicular to, in the case of the present example) the main scan direction (first direction). An image is sequentially printed on the print medium P by alternately repeating a print scan in which the print head H ejects ink while moving together with the carriage 8 in a forward direction indicated by the arrow X1 or a backward direction indicated by the arrow X2, and a conveyance operation that conveys the print medium P in the sub-scan direction (second direction) by a predetermined amount.

In such a serial-scan printing apparatus, it is possible to perform so-called multi-pass printing to suppress the effect of unevenness or the like of nozzles in the print head H and improve the image quality of the print image. In multi-pass printing, a print image over a unit region on the print medium P is completed by print scan that causes the print head H to scan for a plurality of times. In the case where multi-pass printing is performed, the number of scanning times (number of passes) of the print head H over a unit region is set according to the printing mode and other conditions.

The print head H of the present example has provided thereon nozzles for ejecting cyan C, magenta M and yellow Y color ink, as well as silver nano-particle ink S, which is functional ink containing particles that exhibit metallic luster (ink containing metal particles). The aforementioned types of ink (color ink and ink containing metal particles) are supplied to the print head H from ink tanks which are not illustrated, and selectively ejected from a plurality of nozzles provided on the print head H, on the basis of print data. The print head H ejects the aforementioned types of ink from ejection ports corresponding to the nozzles using an ejection energy generating element such as an electric heat conversion element (heater) or a piezoelectric element. The plurality of nozzles are arranged so as to form a nozzle row extending in a direction intersecting with (perpendicular to, in the case of the present example) the main scan direction.

Figure 2:
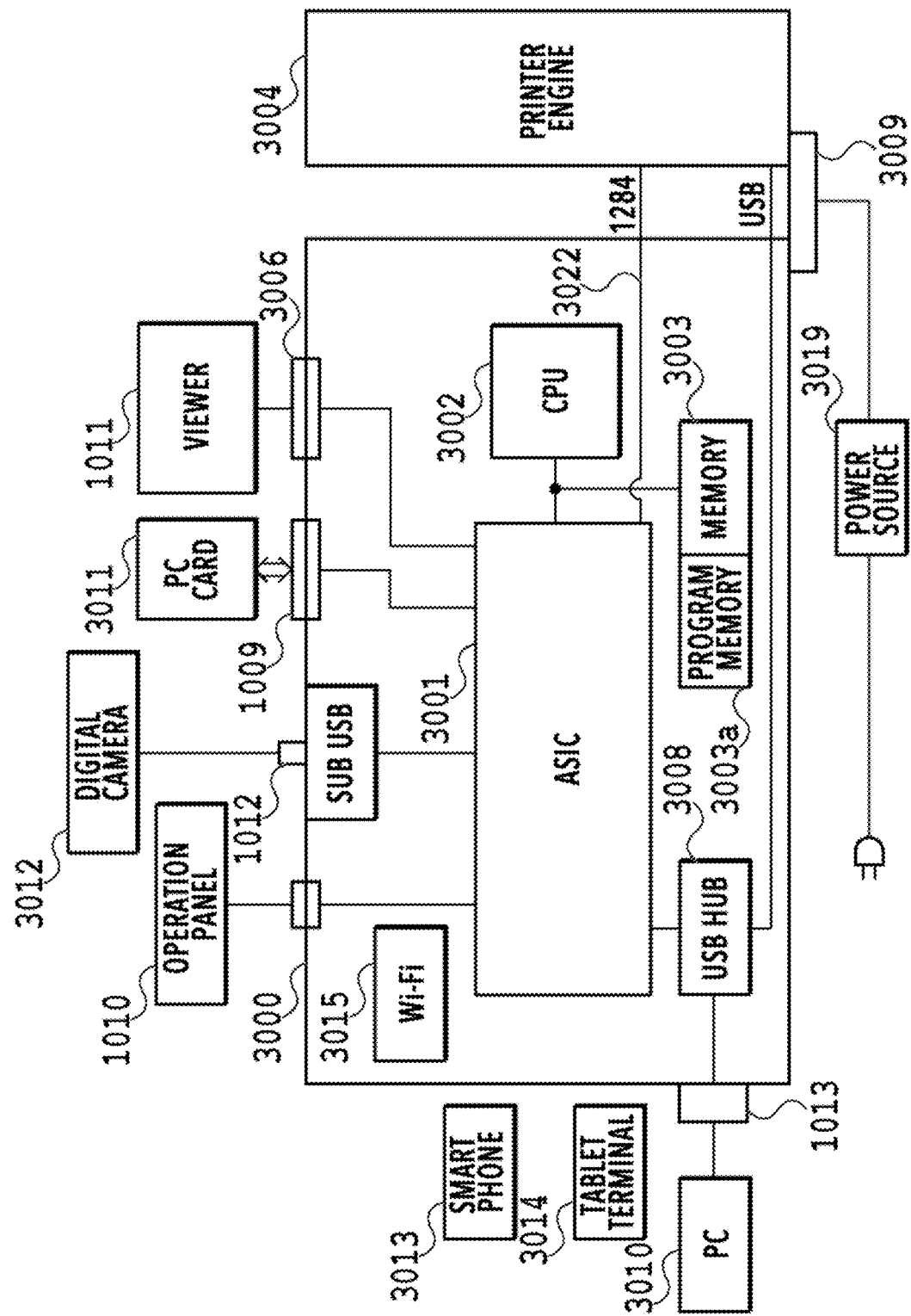
FIG. 2 is a block diagram of a control system in the printing apparatus of FIG. 1.

FIG. 2 is a block diagram for describing a control system of the printing apparatus.

An image processing ASIC (dedicated custom LSI) 3001 and a CPU 3002 of a control unit (control board) 3000 serves to perform various control processing described below, conversion from image data (RGB) to ink data (CMY), and image processing such as scaling, gamma conversion, quantization, or the like. Furthermore, the aforementioned components perform conversion from input image data for functional ink (S ink) into functional ink data. A memory 3003 includes a program memory 3003a that stores a control program of the CPU 3002, and a memory area that functions as RAM area that stores a program at the time of execution and as a work memory that stores image data. In addition, the memory area of the memory 3003 includes a nonvolatile memory that stores a mask-use history described below.

In the present example, an inkjet printer engine that prints color images using color ink of a plurality of colors is mounted as a printer engine 3004. A USB connector 1012 is a port for connecting a digital camera (DSC) 3012. A memory card 3011 is connected via a card slot 1009. A connector 3006 has a viewer 1011 connected thereto. A USB HUB 3008 passes image data received from a PC 3010 to the image processing ASIC 3001.

The printing apparatus 1000 prints an image on the basis of image data which has been subjected to various image processing by the image processing ASIC 3001. In the case where the printing apparatus 1000 performs printing on the basis of print data from the PC 3010, which has been subjected to image processing, the data from the PC 3010 is directly input to the printer engine 3004 via a USB 3021. Accordingly, the PC 3010 connected to the printing apparatus 1000 is allowed to transmit and receive data and signals to and from the printer engine 3004 directly, and perform printing. A Wi-Fi device 3015, which is wirelessly connected to a smart phone 3013 and a tablet terminal 3014, receives image data from the smart phone 3013 and the tablet terminal 3014, and passes the image data to the image processing ASIC 3001. The printing apparatus 1000 prints an image on the basis of the image data which has been subjected to various image processing by the image processing ASIC 3001. In the case where printing is performed on the basis of the print data from the smart phone 3013 and the tablet terminal 3014, which has been subjected to image processing, the data is directly input to the printer engine 3004 via the USB 3021. Accordingly, the smart phone 3013 and the tablet terminal 3014 connected to the printing apparatus 1000 are allowed to transmit and receive data and signals to and from the printer engine 3004 and perform printing.

A power source connector 3009 inputs DC voltage which has been converted from commercial AC by a power source 3019. In addition, transmission and reception of signals is performed between the control unit 3000 and the printer engine 3004 via the USB 3021 described above or an IEEE 1284 bus 3022.

Control System of Printer Engine

Figure 3:
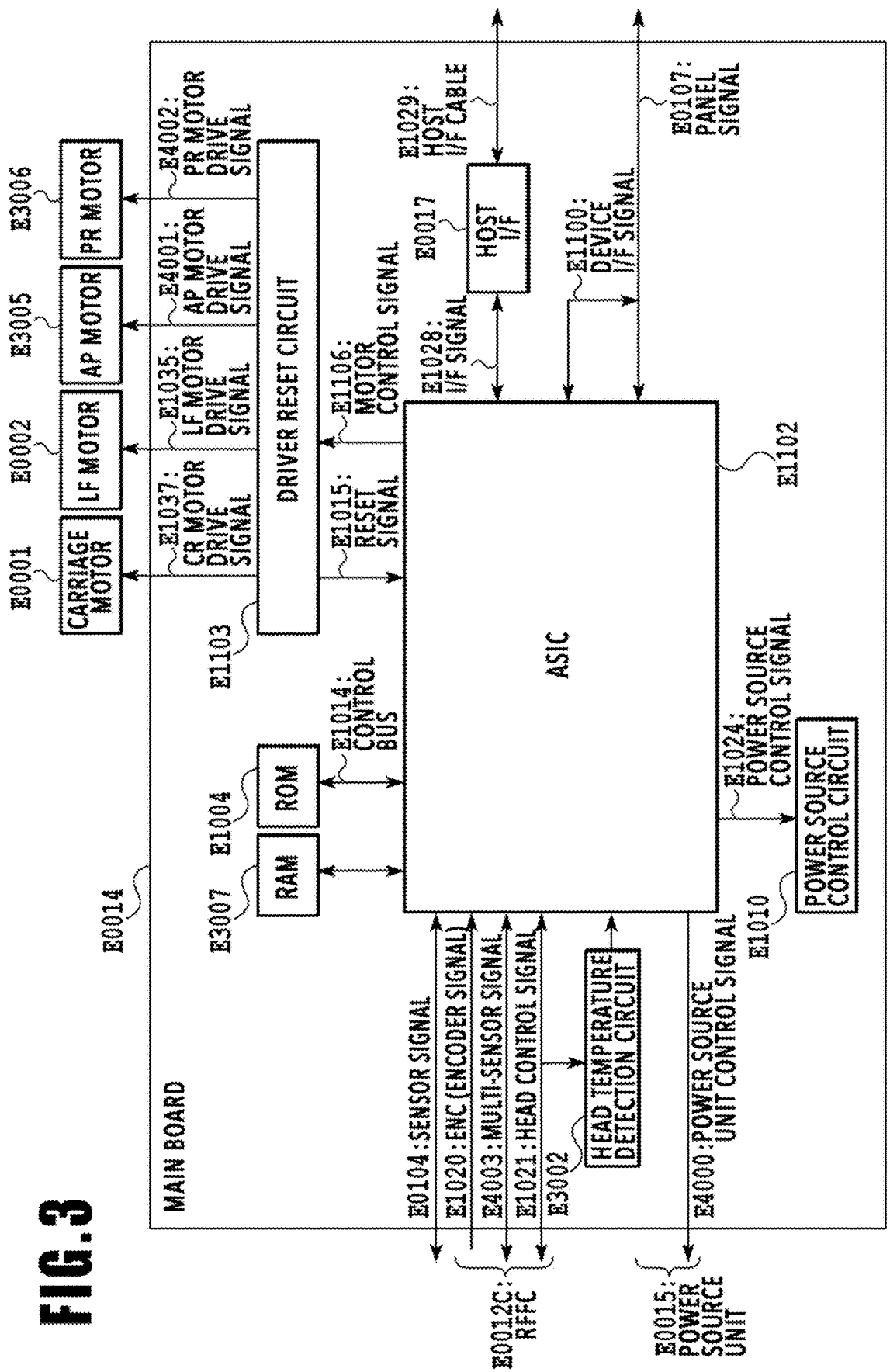
FIG. 3 is a block diagram of an internal configuration of a printer engine of FIG. 2.

FIG. 3 is a block diagram for describing an internal configuration of the printer engine 3004.

An engine unit ASIC E1102 provided on the main board E0014 of the printer engine 3004 is connected to a ROM E1004 via a control bus E1014, and performs various control according to a program stored in the ROM E1004. For example, the engine unit ASIC E1102 transmits and receives a sensor signal E0104 related to various sensors and a multi-sensor signal E4003 related to a multi-sensor E3000. In addition, the engine unit ASIC E1102 detects the state of an encoder signal E1020, a power key E0018 on the front panel, a resume key E0019, and a flat pass key E3004. Furthermore, the engine unit ASIC E1102 controls respective components to perform drive control of the printing apparatus 1000 by performing various logic operations and condition determination in accordance with the connection state and the data input state of a host I/F E0017 and a device I/F on the front panel.

A driver reset circuit E1103 generates drive signals E1037, E1035, E4001 and E4002 according to a motor control signal E1106 from the engine unit ASIC E1102. On the basis of the drive signals E1037, E1035, E4001 and E4002, a CR motor E0001, an LF motor E0002, an AP motor E3005, and a PR motor E3006, respectively corresponding thereto, are driven. In addition, the driver reset circuit E1103 has a power source circuit and supplies required electric power to respective units such as the main board E0014, a carriage board, and the front panel. Furthermore, the driver reset circuit E1103, upon detecting a drop of power source voltage, performs generation and initialization of a reset signal E1015.

A power source control circuit E1010 controls power supply to each sensors including light emitting element according to power source control signal E1024 from the engine unit ASIC E1102. The host I/F E0017 transmits a host I/F signal E1028 from the engine unit ASIC E1102 to a host I/F cable E1029 connected to the outside, and transmits signals from the cable E1029 to the engine unit ASIC E1102. The host I/F signal E1028 is transmitted to the PC 3010 via the image processing ASIC 3001 and a USB HUB 3008 of the control unit 3000 of FIG. 2.

The electric power supplied from a power source unit E0015 is transformed as necessary and subsequently supplied to respective units inside and outside the main board E0014. In addition, the power source unit E0015 controls the low power consumption mode or the like of the printing apparatus main body on the basis of a power source unit control signal E4000 from the engine unit ASIC E1102. The power source unit E0015 is connected to a power source connector 3009 of FIG. 2.

The engine unit ASIC E1102 of the present example, which is a one-chip semiconductor integrated circuit with an operation processing device built therein, outputs the motor control signal E1106, the power source control signal E1024, and the power source unit control signal E4000 described above. In addition, the engine unit ASIC E1102 exchanges signals with the outside via the host I/F E0017, and exchanges signals with a device I/F E0100 on the front panel according to a panel signal E0107. In addition, the engine unit ASIC E1102 detects the state of respective sensors such as a PE sensor or an ASF sensor, on the basis of the sensor signal E0104. Furthermore, the engine unit ASIC E1102 controls and detects the state of the multi-sensor E3000 on the basis of the multi-sensor signal E4003. In addition, the engine unit ASIC E1102 detects the state of the panel signal E0107, controls the front panel, and causes an LED E0020 on the front panel to flicker.

In addition, the engine unit ASIC E1102 generates a timing signal on the basis of an encoder signal (ENC) E1020, interfaces with the print head H according to a head control signal E1021, and controls the print operation. The encoder signal (ENC) E1020, which is an output signal of the encoder sensor, is input via a flexible flat cable. The head control signal E1021 is input to the carriage board via the flexible flat cable, and supplied to the print head H via a head drive voltage modulation circuit and a head connector. In addition, various information from the print head H is transmitted to the ASIC E1102 via the head connector. Signals of head temperature information for each ink ejection unit on the print head H are amplified by a head temperature detection circuit E3002 of the main board E0014, and subsequently input to the engine unit ASIC E1102 to be used for various control.

A DRAM E3007 is used as a data buffer for printing, and a buffer of data received from various devices such as the image processing ASIC 3001 of the control unit 3000 of FIG. 2. Such devices are the PC 3010, the memory card 3011, the DSC 3012, the smart phone 3013, the tablet terminal 3014, or the like. In addition, the DRAM E3007 is also used as a work region required for various control.

Image Processing

Figure 4:
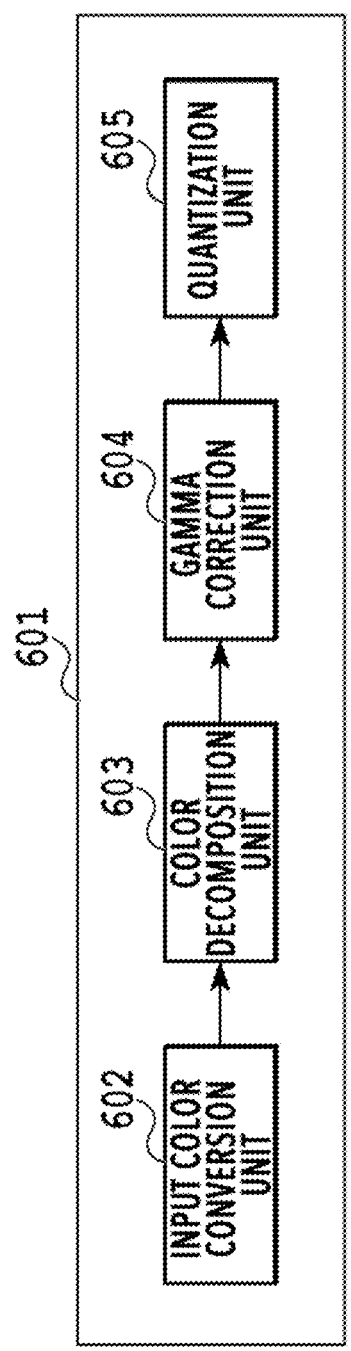
FIG. 4 is a block diagram of an image processing unit.

FIG. 4 is a block diagram for describing the image processing performed in the ASIC 3001 or the CPU 3002. In the present example, description will be provided assuming that image processing is performed in the ASIC 3001.

First, a case will be described where printing is performed using C, M and Y ink loaded on the printing apparatus 1000, on the basis of image data input from the PC 3010, the memory card 3011, the DSC 3012, the smart phone 3013, the tablet terminal 3014, or the like. The input image data is assumed to be multi-value data (8 bits) of RGB.

The RGB data which has been input to an image processing unit 601 is converted by an input color conversion unit 602 into multi-value data (8 bits) of R'G'B' in a reproducible color reproduction area in the printing apparatus 1000. Specifically, the data is converted by a known technique such as matrix operation processing or three-dimensional look-up table (3DLUT) processing. 3DLUT is a table holding a combination of the input RGB data and the converted R'G'B' data. For example, in the case of holding the ink colors R, G and B respectively in a table with 16 gradation scales, i.e., 0, 17, 34, . . . 221, 238 and 255 out of values 0 to 255, it turns out that there are 16×16×16=4096 combinations. Inputting RGB data in accordance with such a combination results in a corresponding output of R'G'B' data on the table. In the case where RGB data other than such a combination is input, R'G'B' data is calculated according to a known tetrahedron interpolation operation that uses four combinations in proximity thereto. A color decomposition unit 603 decomposes such R'G'B' data into CMY data, which turns out to be CMY multi-value data (8 bits). As thus described, data is converted by a known technique such as matrix operation processing or 3DLUT processing.

A gamma correction unit 604 corrects the CMY data so that the brightness of the image printed by the printing apparatus 1000 varies linearly relative to the CMY data, which turns out to be C'M'Y' multi-value data (12 bits). In the present example, such a correction is performed using a one-dimensional look-up table (1DLUT). The aforementioned color conversion is performed using look-up tables respectively corresponding to each color.

A quantization unit 605 quantizes the C'M'Y' data, which turns out to be quantized data. For the quantization, a known dither method or an error diffusion method is used. In the case of the present example, the quantized data is quantized into binary values of 1-bit data for each of C, M and Y inks. In the case where the 1-bit quantized data per color takes a value of "0", ink is not ejected (non-ejection) from the nozzle of the print head H corresponding thereto, whereas ink is ejected from a nozzle corresponding thereto in the case where the value is "1". Ejecting ink from the print head H in accordance with such quantized data causes a color image to be printed on the print medium P.

Next, a process of converting input image data relating to silver nano-particle ink (S ink) as the ink containing metal particles into quantized data will be described.

In the case of the present example, S data is input as silver multi-value data (8 bits) from the PC 3010, the memory card 3011, the DSC 3012, the smart phone 3013, the tablet terminal 3014, or the like. The S data is multi-value data which is distinguished from the RGB data. The S data which has been input to the image processing unit 601 is input to the gamma correction unit 604 without being processed in the input color conversion unit 602 and the color decomposition unit 603. The gamma correction unit 604 corrects the S data into multi-value S' data (12 bits) so that the brightness or the luster degree of a print image of the printing apparatus 1000 varies linearly relative to the S data. The quantization unit 605 quantizes the S' data, which turns out to be quantized data. A known dither method or an error diffusion method is used for the quantization. The quantized data is quantized into binary values as 1-bit data for S ink, in the case of the present example. In the case where the 1-bit quantized data for S ink is "0", silver nano-particle ink (S ink) is not ejected (non-ejection) from the nozzle of the print head H corresponding thereto, whereas silver nano-particle ink is ejected from a nozzle corresponding thereto in the case of "1". Ejecting silver nano-particle ink from the print head H in accordance with such quantized data causes a silver image to be printed on the print medium P.

Multi-Pass Printing

FIGS. 5A to 5D are explanatory diagrams of an example of multi-pass printing. The multi-pass printing of the present example is four-pass printing that uses the print head H having provided thereon 256 nozzles corresponding to a resolution of 600-dpi for each of C, M, Y and S inks so as to complete an image by scanning a unit region (print region) of the print medium P four times by the print head H. FIGS. 5A to 5D illustrate only the nozzle N for S ink on the print head H. The print head H similarly has nozzles for C, M and Y inks provided thereon, with the number of nozzles for each of the C, M, Y and S inks respectively being 256.

Figures 5A, 5B:
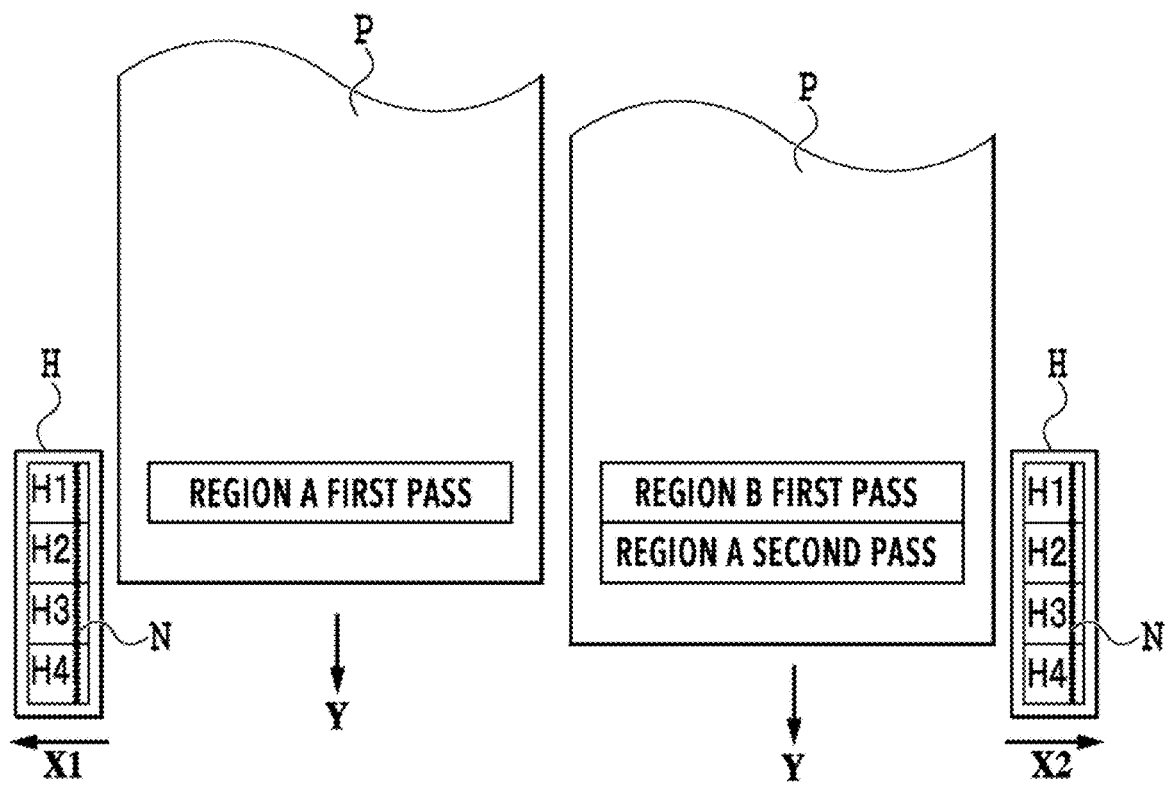
FIGS. 5A, 5B, 5C and 5D are explanatory diagrams of multi-pass printing.

FIG. 5A is an explanatory diagram of a first-pass print operation over a region A on the print medium P. The first-pass printing is performed on the region A by a print scan (main scan) of the print head H in an X1 direction using a nozzle region H1 including 64 nozzles, i.e., ¼ of all the 256 nozzles and, subsequent to the printing, the print medium P is conveyed in a Y-direction by a distance equivalent to 64 nozzles.

FIG. 5B is an explanatory diagram of a second-pass print operation of on the region A. The second-pass printing is performed on the region A by a print scan (main scan) of the print head H in an X2 direction using a nozzle region H2 including 64 nozzles displaced from the nozzle region H1 in the Y-direction. On this occasion, the first-pass printing is performed on the region B on the print medium P, using the nozzle region H1. After such printing, the print medium P is conveyed in the Y-direction by a distance equivalent to 64 nozzles.

Figures 5C, 5D:
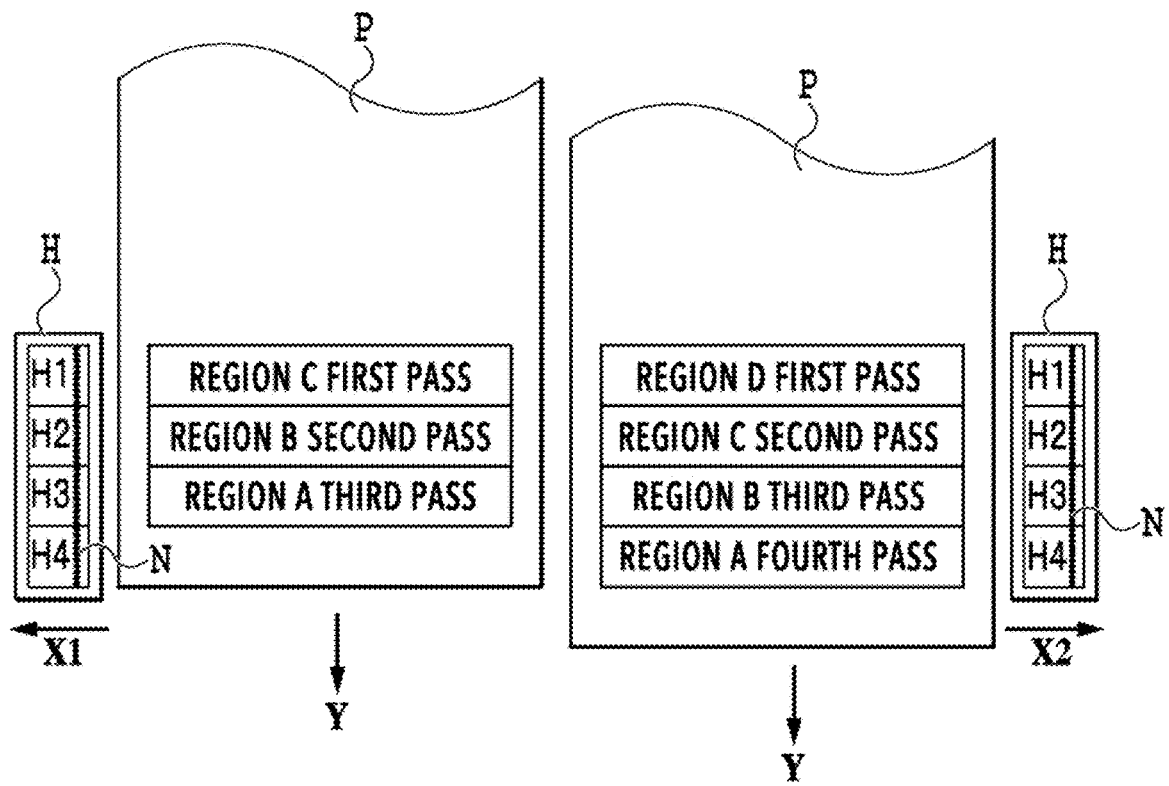

FIG. 5C is an explanatory diagram of a third-pass print operation on the region A. The third-pass printing is performed on the region A by a print scan of the print head H in the X1 direction using a nozzle region H3 including 64 nozzles displaced from the nozzle region H2 in the Y-direction. On this occasion, the second-pass printing is performed on the region B on the print medium P using the nozzle region H2, and the first-pass printing is performed on the region C on the print medium P using the nozzle region H1. After such printing, the print medium P is conveyed in the Y-direction by a distance equivalent to 64 nozzles.

FIG. 5D is an explanatory diagram of a fourth-pass print operation on the region A. The fourth-pass printing is performed on the region A by a print scan of the print head H in the X2 direction using a nozzle region H4 including 64 nozzles displaced from the nozzle region H3 in the Y-direction. On this occasion, the third-pass printing is performed on the region B on the print medium P using the nozzle region H3, the second-pass printing is performed on the region C on the print medium P using the nozzle region H2, and the first-pass printing is performed on the region D on the print medium P using the nozzle region H1. After such printing, the print medium P is conveyed in the Y-direction by a distance equivalent to 64 nozzles.

In the aforementioned manner, a print image on the region A is completed by four passes. Repeating similar operations sequentially prints images on other regions by four passes.

Figure 6:
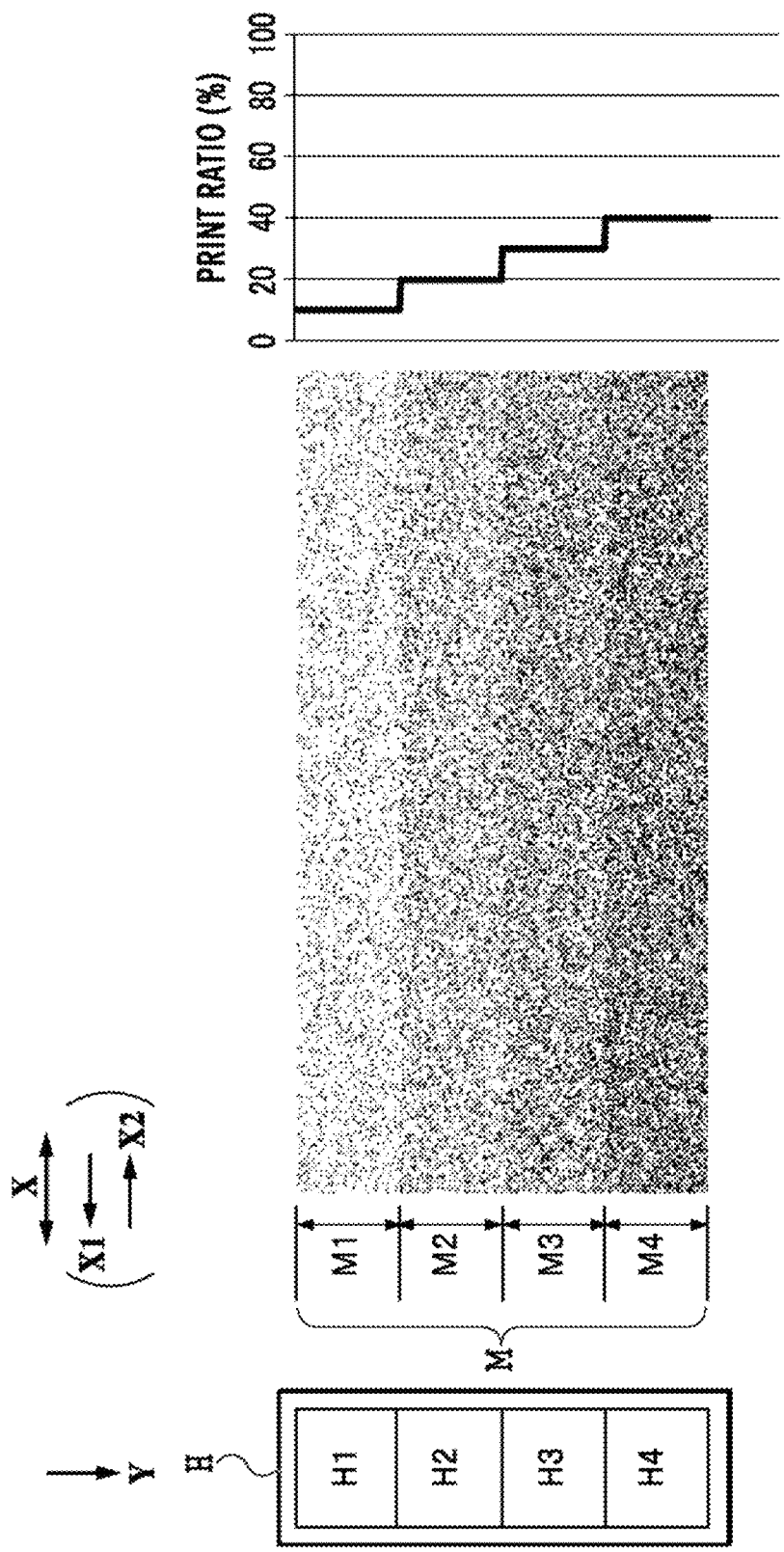
FIG. 6 is an explanatory diagram of a pass mask used in multi-pass printing.

Next, a method of allocating quantized data corresponding to such four-pass printing will be described. FIG. 6 is an explanatory diagram of a pass mask for multi-pass printing. The present example is an example of four-pass printing that uses 256 nozzles, similarly to the case of FIGS. 5A to 5D.

A pass mask M of FIG. 6 has 512 pixels in the main direction indicated by the arrow X and 256 pixels in the sub-scan direction indicated by the arrow Y, each pixel including 1 bit. In FIG. 6, a pixel with a value "0" is represented in white, whereas a pixel with a value "1" is represented in black. In the pass mask M, a mask region M1 corresponds to the first pass, and a mask region M2 corresponds to the second pass. Similarly, a mask region M3 corresponds to the third pass, and a mask region M4 corresponds to the fourth pass.

In the mask regions M1, M2, M3 and M4, the ratio of pixels having the value "1" is about 10%, about 20%, about 30% and about 40%, respectively. In the following, the ratio of the number of pixels with value "1" relative to the total number of pixels in each mask region is referred to as "print ratio". In the case where the mask regions M1, M2, M3 and M4 are overlapped, pixels having the value "1" are located exclusively between respective mask regions. In the case where the mask regions are overlapped, the total region (100%) of the 512 pixels in the main scan direction and the 64 pixels in the sub-scan direction turns out to be of pixels having the value "1".

In the following, for a certain type of ink (also referred to a "target ink, in the following), there will be described a case where all the quantized data corresponding to the region A of the print medium P takes the value "1", i.e., a case where the target ink is to be ejected to all on the region A.

In the case of printing on the region A using the nozzle region H1 as illustrated in FIG. 5A, the mask region M1 of FIG. 6 is used. A pixel at the left top end of FIG. 5A of the region A and a pixel at the left top end of FIG. 6 of the mask region M1 are associated with each other, and a logical product is calculated between the value of the quantized data of the former pixel and the value of the latter pixel. In the case where the result of the logical product is "1", the pixels are regarded as those on which the target ink is to be ejected, and the pixels are regarded as those on which the target ink is not to be ejected in the case where the result is "0". Similarly, for pixels other than the pixel at the left top end of the drawing, a logical product is calculated between a pixel value in the region A and a pixel value in the region M1 corresponding to each other and, in accordance with the result of the logical product, it is determined whether or not they are pixels on which the target ink is to be ejected. In the case where the number of pixels in the main scan direction of the mask region M1 falls short of the number of pixels of the quantized data in the main scan direction of the region A, the pixel at the left top end of FIG. 6 of the mask region M1 is associated again with the pixel position of the region A in which the number of pixels of the mask region M1 falls short. Repeating such an association allows for determining whether or not to eject the target ink for respective pixel positions in the region A.

In the case of printing on the region A using the nozzle region H2 as illustrated in FIG. 5B, the mask region M2 of FIG. 6 is used. Similarly to the aforementioned case, a pixel of the region A and a pixel of the mask region M2 are associated with each other and, in accordance with the result of the logical product of the values of the pixels, it is determined whether or not they are pixels on which the target ink is to be ejected. In the case of printing on the region A using the nozzle region H3 as illustrated in FIG. 5C, the mask region M3 of FIG. 6 is used. Similarly to the aforementioned case, a pixel of the region A and a pixel of the mask region M3 are associated with each other and, in accordance with the result of the logical product of the values of the pixels, it is determined whether or not they are pixels on which the target ink is to be ejected. In the case of printing on the region A using the nozzle region H4 as illustrated in FIG. 5D, the mask region M4 of FIG. 6 is used. Similarly to the aforementioned case, a pixel of the region A and a pixel of the mask region M4 are associated with each other and, in accordance with the result of the logical product of the values of the pixels, it is determined whether or not they are pixels on which the target ink is to be ejected.

Data processing as described above allows for printing an image on the region A via four passes. Similarly for the regions B, C and D, a pixel in the regions and a pixel in the mask region are associated with each other and, in accordance with the result of the logical product of the values of the pixels, it is determined whether or not they are pixels on which the target ink is to be ejected.

Metal Particles in Ink Containing Metal Particles

The content (mass %) of metal particles in the ink containing metal particles is preferred to be equal to or larger than 0.1 mass % and equal to or smaller than 30.0 mass %, and more preferably, equal to or larger than 1.0 mass % and equal to or smaller than 15.0 mass %), relative to the total ink mass.

The type of metal particles is not limited in particular, and may include particles such as, for example, gold, silver, copper, platinum, aluminum, titanium, chromium, iron, nickel, zinc, zirconium, tin, or the like. The metal particles may be a simple substance or an alloy, or may be used in combination thereof. In addition, from the viewpoint of storage stability of metal particles, and luster of images to be formed, it is preferred to use gold, silver, or copper particles, and more preferably silver particles, as the metal particles. Silver particles, due to the high luster and monochromaticity of images formed thereby, are capable of exhibiting a wide range of metallic colors via combination with color ink.

The average particle diameter of silver particles used in the present example is preferred to be equal to or larger than 1 nm and equal to or smaller than 200 nm, and more preferably equal to or larger than 10 nm and equal to or smaller than 100 nm, from the viewpoint of storage stability of ink and luster of images to be formed by silver particles. As a specific measurement method of the average particle diameter, FPAR-1000 (product of Otsuka Electronics Co., Ltd., cumulant method analysis) using laser beam scattering, Nanotrac UPA 150EX (product of Nikkiso Co., Ltd., using an integrated value such as 50% of the volume average particle diameter), or the like, may be used.

Dispersant of Ink Containing Metal Particles

The method of dispersing metal particles is not limited in particular. For example, resin dispersing metal particles dispersed by dispersion resin or metal particles dispersed by a surfactant, or the like may be used. It goes without saying that metal particles of different dispersing methods may also be used in combination.

Water soluble or water dispersible resin may be used as the dispersion resin. Particularly, it is preferred that the weight-average molecular weight of the dispersion resin is equal to or larger than 1,000 and equal to or smaller than 100,000, more preferably equal to or larger than 3,000 and equal to or smaller than 50,000. The following materials, for example, may be used as the dispersion resin: styrene, vinyl naphthalene, aliphatic alcohol ester of α, β-ethylenically unsaturated carboxylic acid, acrylic acid, maleic acid, itaconic acid, fumaric acid, vinyl acetate, vinyl pyrrolidone, acrylic amide, or a polymer formed from monomers of derivatives thereof. Note that one or more monomers forming a polymer are preferred to be hydrophilic monomers, in which a block copolymer, a random copolymer, a graft copolymer, or a salt thereof may be used. Or otherwise, natural resin such as rosin, shellac or starch may also be used. It is preferred that such resin is alkali soluble, i.e., soluble in aqueous solution of a base.

Surfactants such as an anionic surfactant, a nonionic surfactant, and an ampholytic surfactant may be used as the surfactant. Specifically, polyoxyethylene alkyl ether, polyoxyethylene alkyl phenols, an acetylene glycol compound, an acetylene glycol ethylene oxide adduct, or the like may be used. In addition, the aforementioned surfactants may be further added for the purpose of adjusting the surface tension of ink.

Aqueous Medium of Ink Containing Metal Particles

It is preferred to use aqueous medium containing water and a water-soluble organic solvent for the ink containing metal particles used in the present example. The content (mass %) of the water-soluble organic solvent in the ink is preferred to be equal to or larger than 3.0 mass % and equal to or smaller than 50.0 mass %, relative to the total ink mass. In addition, the content (mass %) of water in the ink is preferred to be equal to or larger than 50.0 mass % and equal to or smaller than 95.0 mass %, relative to the total ink mass.

The following materials may be used as the water-soluble organic solvent, for example: alkyl alcohols such as methanol, ethanol, propanol, propanediol, butanol, butanediol, pentanol, pentanediol, hexanol, or hexanediol; amides such as dimethylformamide, or dimethyl acetamide; ketones or ketoalcohols such as acetone or diacetone alcohol; ethers such as tetrahydrofuran or dioxane; polyalkylene glycols with an average molecular weight of 200, 300, 400, 600, 1,000 and the like such as polyethylene glycol or polypropylene glycol; alkylene glycols having an alkylene group of 2 to 6 carbon atoms such as ethylene glycol, propylene glycol, butylene glycol, triethylene glycol, 1,2,6-hexanetriol, thiodiglycol, hexylene glycol, or diethylene glycol; lower alkyl ether acetates such as polyethylene glycol monomethyl ether acetate; glycerin; lower alkyl ethers of polyhydric alcohol such as ethylene glycol monomethyl (or ethyl) ether, diethylene glycol methyl (or ethyl) ether or triethylene glycol monomethyl (or ethyl) ether. In addition, it is preferred to use deionized water (ion-exchanged water) as the water.

Other Components of Ink Containing Metal Particles

The ink containing metal particles used in the present example may contain various types of additives such as a pH adjusting agent, an antirust agent, an antiseptic agent, an anti-mold agent, an anti-oxidation agent, an anti-reducing agent or an evaporation accelerator, as necessary.

In the following, an example will be described that uses ink having dispersed therein silver particles of a nano-order average particle diameter, as the ink containing metal particles.

Pass Mask in the Present Embodiment

FIGS. 7A and 7B are explanatory diagrams of a pass mask for C, M and Y inks to be used in the present embodiment.

In the inkjet printing apparatus, the ejection direction of ink ejected from a nozzle near the end of the print head H (near the end of the nozzle row) tends to deviate toward the central part of the print head H (central part of the nozzle row). This is because of occurrence of a phenomenon of decreased air pressure in the region of ink ejection due to the effect of air current generated by flight of ink in the air. For example, in the case where all the nozzles of the print head H eject ink by a same number of ejections, air pressure of the region near the nozzle region H2 decreases in the region of ink ejection corresponding to the nozzle region H1. Therefore, the ejection direction of ink ejected from a nozzle in a region belonging to the nozzle region H1 and located far from the nozzle region H2 deviates toward the direction of the nozzle region H2 and, as a result, the landing position of ink on the print medium may be displaced from a desired position, which may bring about degradation of image quality. Similarly, ink ejected from a nozzle belonging to the nozzle region H4 and located far from the nozzle region H3 may deviate toward the direction of the nozzle region H3.

In the present embodiment, considering such a phenomenon, a low print ratio is set for the mask regions M1 and M4 corresponding to the nozzle regions H1 and H4 located in an end of the print head H, as illustrated in FIG. 7A. Specifically, a print ratio of about 15% is set for each of the mask regions M1 and M4, and a print ratio of about 35% is set for each of the mask region M2 and M3. Accordingly, it is possible to suppress the number of ejections deviated toward the flight direction of the ink ejected from the nozzle at the end in FIG. 7A.

In addition, difference of the print ratio between the vicinity of the boundary of the nozzle regions H1 and H2, and the vicinity of the boundary of the nozzle regions H3 and H4 of FIG. 7A turns out to be about 20%, and the difference of the print ratio may cause ejection direction of ink to deviate. In such a case, it is possible to suppress deviation of the ejection direction of ink by using a pass mask that causes the print ratio to smoothly vary, as illustrated in FIG. 7B, which allows for printing higher quality images. In the case of the example of FIG. 7B, the print ratio of the mask region M1 smoothly varies in a range of for 0 to 25%, the print ratio of the mask region M2 in a range of 25 to 50%, the print ratio of the mask region M3 in a range of 50 to 25%, and the print ratio of the mask region M4 in a range of 25 to 0%.

Fixation Mechanism of S Ink

FIGS. 8A to 8D are explanatory diagrams of a fixing mechanism of S ink on the print medium P.

Figure 8A:
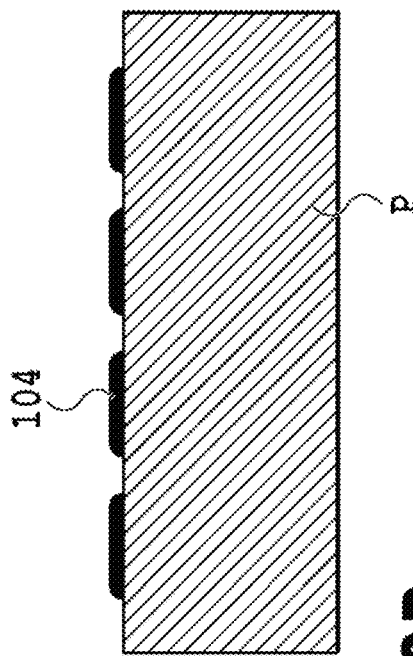
FIGS. 8A, 8B, 8C and 8D are explanatory diagrams of a fixing mechanism of ink containing metal particles.
Figure 8B:
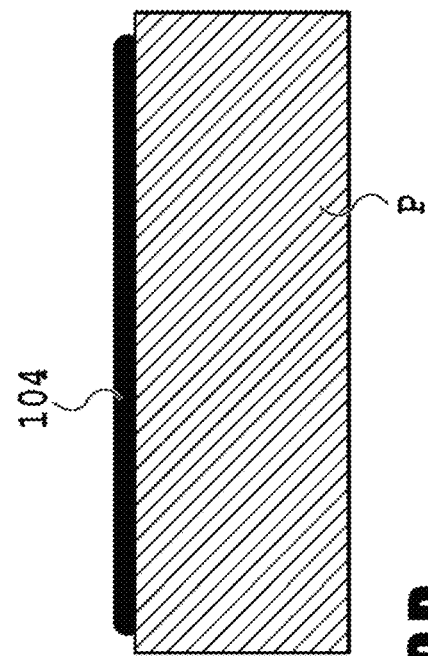

FIG. 8A is a schematic view of the case where S ink 101 ejected with a print ratio of 25% has landed on the print medium P. The S ink 101 on this occasion is in a state where silver particles 102 (black dots in the drawing) are dispersed in aqueous medium 103. FIG. 8B is a schematic view of a state where the aqueous medium 103 in the S ink 101 of FIG. 8A has penetrated into the print medium P, the silver particles 102 dispersed in the aqueous medium 103 have been fixed on the print medium P, and a silver layer 104 (black layer in the drawing) has been formed. In the course of the aqueous medium 103 penetrating into the print medium P, the nano-order silver particles 102 contact each other to form a silver layer (silver film) 104 on the print medium P. The silver layer 104 formed as such exhibits monochromatic metallic luster on the print medium P.

Figure 8C:
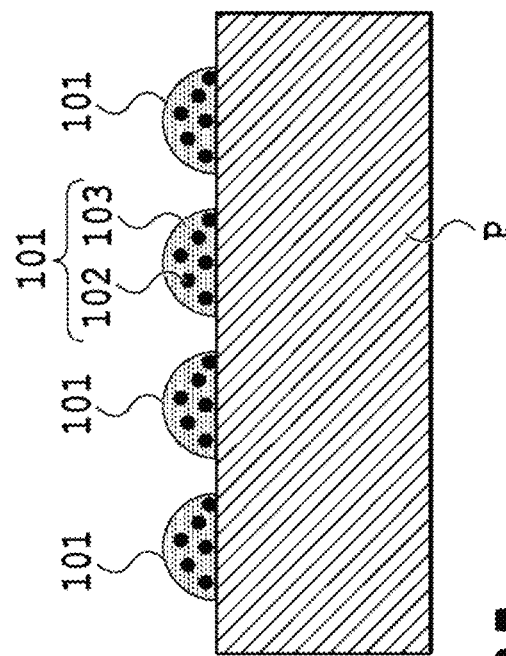
Figure 8D:
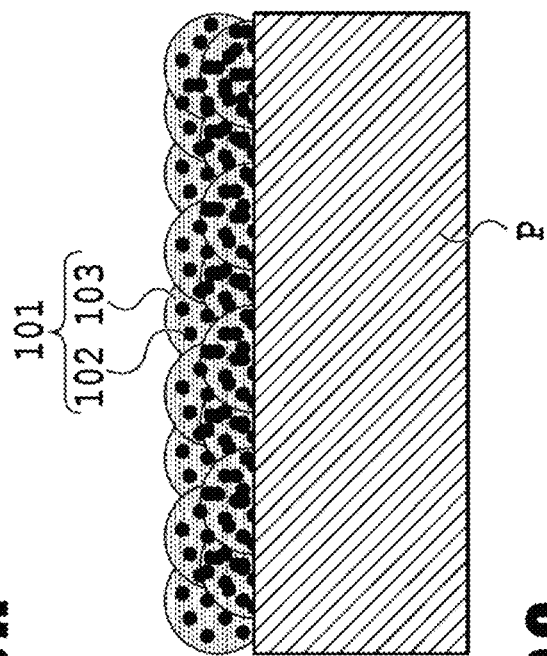

FIG. 8C is a schematic view of the case where the S ink 101 ejected with a print ratio of 100% has landed on the print medium P. The S ink 101 on this occasion is in a state where the silver particles 102 are dispersed in the aqueous medium 103, similarly to the case of FIG. 8A. However, in comparison with the case of FIG. 8A, the S ink 101 lands on the surface of the print medium P in a large amount. In the case where the aqueous medium 103 penetrates into the print medium P from this state, it takes a longer time for the aqueous medium 103 to complete penetration than the case of FIG. 8A. Therefore, it takes a longer time for the large amount of silver particles 102 to be fixed on the print medium P, whereby the opportunity that the silver particles 102 contact each other increases accordingly. As a result, the silver layer 104 exhibiting metallic luster expands. FIG. 8D is a schematic view of a state where the aqueous medium 103 in the S ink 101 of FIG. 8C has penetrated into the print medium P, the silver particles 102 being dispersed in the aqueous medium 103 have been fixed on the print medium P, and the silver layer 104 (black layer in the drawing) has been formed.

Causing a same amount of the S ink 101 as the case of FIG. 8A to land on the print medium P of FIG. 8B repeatedly three more times changing the landing position, resulting in a total of four repetition times, allows for landing of as large an amount of the S ink 101 as the case of FIG. 8C. In such a case, the amount of landing of the S ink 101 in each iteration is small, and therefore the penetration time of the aqueous medium 103 in each iteration turns out to be the time to transit from the state of FIG. 8A to the state of FIG. 8B. The transition time is shorter than the penetration time of the aqueous medium 103 from the state of FIG. 8C to the state of FIG. 8D, whereby the opportunity that the silver particles 102 contact each other decreases accordingly, resulting in a lower efficiency of contacting each other.

Therefore, in the case where the inkjet printing apparatus uses the S ink 101 for printing, it is preferred to assign a high print ratio to a single scan in terms of exhibitability of metallic luster. In addition, it is preferred to employ multi-pass printing to reduce image degradation due to tolerance during manufacture of a plurality of nozzles in the print head H.

Multi-Pass Printing of Present Embodiment

Figure 9A:
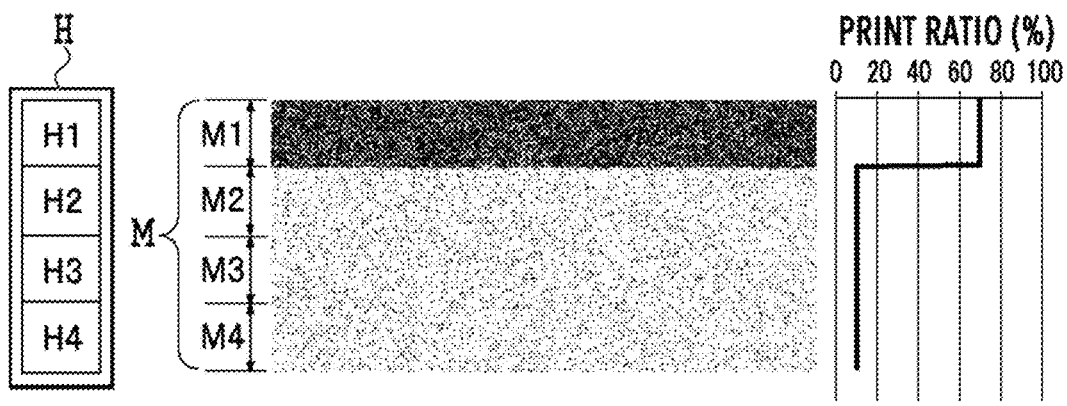
FIGS. 9A, 9B, 9C and 9D are explanatory diagrams of a pass mask for ink containing metal particle.

In multi-pass printing of the present embodiment, there are set a pass mainly aimed to exhibit metallic luster, and a pass mainly aimed to reduce image degradation due to manufacturing tolerance. Specifically, four-pass printing is performed using the pass mask M of FIG. 9A. In FIG. 9A, the print ratio for the mask region M1 is about 70%, and the print ratio for each of the mask regions M2, M3 and M4 is about 10%. The use ratio of nozzles in the nozzle region H1 corresponding to the mask region M1 turns out to be extremely high, i.e., 7 times that of the nozzles in the nozzle regions H2, H3 and H4. Therefore, the life of nozzles in the nozzle region H1 becomes extremely short. From the viewpoint of life of nozzles, it is preferred to change regions with a high print ratio in a round-robin manner, as illustrated in FIGS. 9A, 9B, 9C and 9D. In the drawings, each print ratio of high-print-ratio mask regions is about 70%.

Figure 10A:
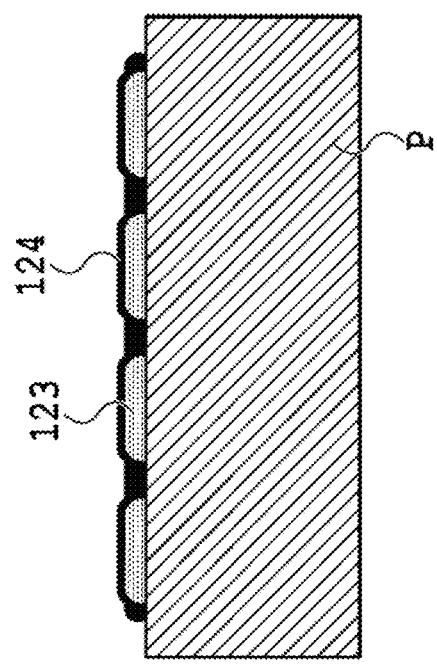
FIGS. 10A and 10B are respectively explanatory diagrams of different formation examples of a layer formed by ink containing metal particles.
Figure 10B:
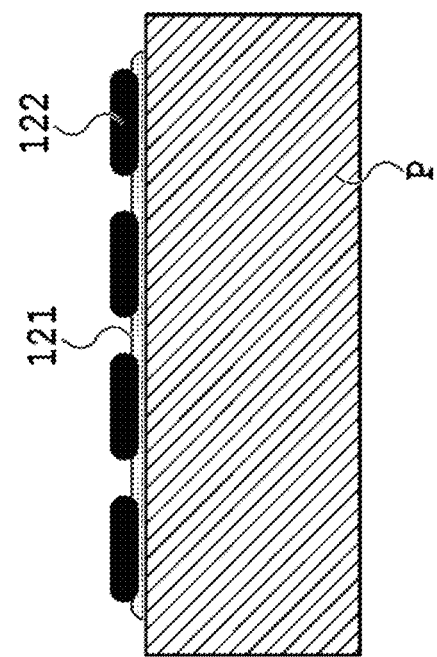

FIGS. 10A and 10B schematically illustrate fixing states of the S ink which are different depending on the order of passes with a high print ratio or a low print ratio.

FIG. 10A is a schematic view of the case where printing by a pass with a high print ratio is preceded, and subsequently printing is performed by a pass with a low print ratio, using the pass mask M of FIG. 9A. On the other hand, FIG. 10B is a schematic view of the case where printing by a pass with a low print ratio is preceded, and subsequently printing is performed by a pass with a high print ratio, using the pass mask M of FIG. 9D. As illustrated in FIGS. 10A and 10B, unevenness occurs on the surface of the silver layer having the S ink fixed thereon.

In the case of FIG. 10A, a silver layer 122 (black layer in the drawing) is formed by a pass with a low print ratio on a flat silver layer 121 (white layer in the drawing) formed by a pass with a high print ratio. In the case of FIG. 10B, a silver layer 124 (black layer in the drawing) is formed by a pass with a high print ratio on a silver layer 123 (white layer in the drawing) formed by a pass with a low print ratio, so that the silver layer 124 covers the silver layer 123. Generally, the size of dots formed by landing ink is larger than the size of pixels to be printed at exclusive positions in respective passes. Therefore, the silver layer 123 formed by preceding dots as illustrated in FIG. 10B turns out to be covered by the silver layer 124 formed by subsequent dots. In the case of FIG. 10B, unevenness occurs in the surface of the silver layer 123 previously formed, and the silver layer 124 is formed by a subsequent pass with a high print ratio so as to smooth the unevenness on the surface of the silver layer 123.

On the other hand, in the case of FIG. 10A, after the silver layer 121 with less unevenness has been formed by a pass with a high print ratio, the silver layer 122 is formed by a pass with a low print ratio so as to increase the degree of unevenness on the surface of the silver layer 121. Accordingly, in the case of FIG. 10A, the degree of unevenness on the surface of the silver layer becomes larger than that in the case of FIG. 10B, whereby the luster decreases in comparison with that in the case of FIG. 10B. Therefore, although there is an effect of suppressing the difference between the use ratios of nozzles, in the case where only the order of pass with a high print ratio is changed without changing the print ratio, such as from FIG. 9A to FIG. 9D, a difference occurs in luster of the printed silver images. In other words, a difference of the degrees of unevenness on the surface of the print image occurs between a print region in which the order of a pass with a high print ratio is early and a print region in which the order is late, and the difference of the degree of unevenness appears as a luster difference of the print image.

FIGS. 11A to 11E are explanatory diagrams of the pass masks MA, MB, MC and MD for four passes to be used in the present embodiment.

The pass masks MA to MD respectively include a mask region corresponding to a pass with a high print ratio, and the print ratios of pass with a high print ratio in the pass masks Ma to MD are different from each other in accordance with the order of the pass with a high print ratio. In other words, the pass mask MA of FIG. 11A has a print ratio (high print ratio) of about 70% for the mask region M1 corresponding to the first pass, whereas the print ratio is about 10% for mask regions corresponding to other passes. The pass mask MB of FIG. 11B has a print ratio (high print ratio) of about 67% for the mask region M2 corresponding to the second pass, whereas the print ratio is about 11% for mask regions corresponding to other passes. The pass mask MC of FIG. 11C has a print ratio (high print ratio) of about 64% for the mask region M3 corresponding to the third pass, whereas the print ratio is about 12% for mask regions corresponding to other passes. The pass mask MD of FIG. 11D has a print ratio (high print ratio) of about 61% for the mask region M4 corresponding to the fourth pass, whereas the print ratio is about 13% for mask regions corresponding to other passes.

As thus described, in the case where the order of the high-print-ratio pass is early such as the first pass, the high print ratio is set higher than the case where the order of the high-print-ratio pass is late such as the fourth pass. In other words, the earlier the order of a high-print-ratio pass is, the higher print ratio is set thereto. Specifically, as illustrated in FIGS. 11A to 11D, the high print ratio is about 70% in the case where the high-print-ratio pass is at the first pass, about 67% at the second pass, about 64% at the third pass, and about 61% at the fourth pass. As thus described, the later the order of a high-print-ratio pass is, the smaller its high print ratio is set. As the result, it is possible to keep the difference small between the degree of unevenness on the surface of the print image in a print region where the order of the high-print-ratio pass is early, as illustrated in FIG. 10A, and in a print region where the order is late, as illustrated in FIG. 10B. Therefore, it is possible to keep the luster difference in the print image small. The present embodiment has succeeded in keeping the luster difference small by setting the print ratio illustrated in FIGS. 11A to 11D. It is preferred to adjust the print ratio as appropriate in accordance with the type of S ink and print medium to be used so as to further enhance the effect of keeping the luster difference small.

As thus described, changing the order of high-print-ratio passes and setting the high print ratio higher for a high-print-ratio pass with an earlier order allows for reducing the partial luster difference of the printed silver image, while suppressing the difference of use ratio of nozzles.

Print Operation

Figure 12:
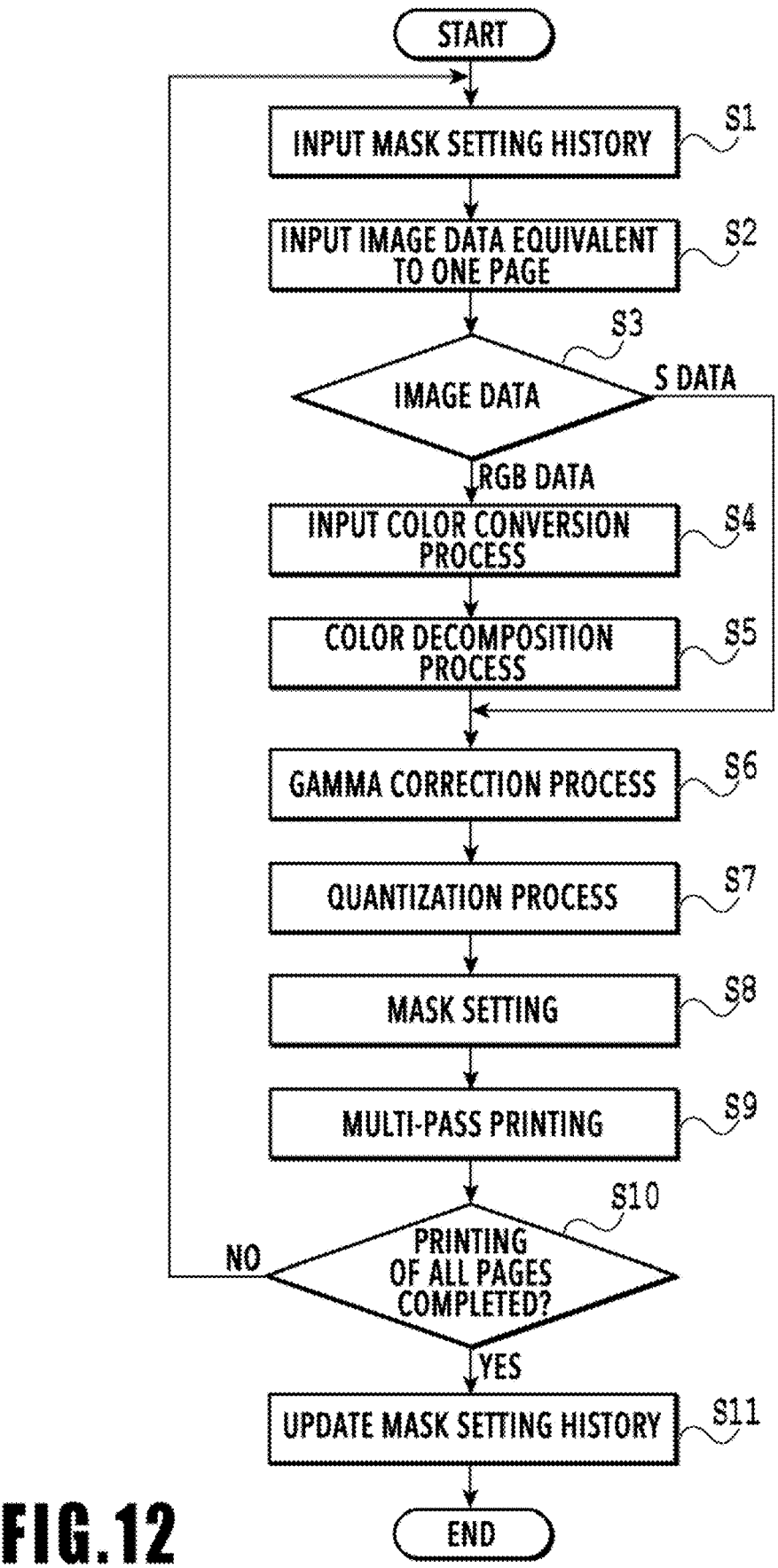
FIG. 12 is a flowchart for describing a print operation.

FIG. 12 is a flowchart for describing a print operation in the present embodiment.

First, mask setting history is input (Step S1). In the present embodiment, the pass mask is changed for each print job in the case of printing a silver image. A print job is a set of print instruction corresponding to one or more pages with a same print medium and a same print quality to be set. For example, printing is performed using one of the pass masks illustrated in FIGS. 11A to 11D for each print job. The mask setting history, having described therein which pass mask is to be used in the current printing, is read from a nonvolatile memory included in a memory area of the memory 3003 of FIG. 2. The CPU 3002 performs a process corresponding to the mask setting history at step S8 described below.

At the next step S2, image data equivalent to one page in the print job is input. The image data is input to the memory 3003, and is referred by the ASIC 3001 and the CPU 3002 in the process or subsequent processes. Next, the CPU 3002 determines whether or not a silver image (S data) is included in the input image data, referring to the image data which has been input to the memory 3003 (Step S3). The S data is processed at step S6 described below, whereas RGB data, which is not the S data, is processed at step S4. The process at step S4 is a process performed by the input color conversion unit 602 of FIG. 4 described above, in which the RGB data is converted into R'G'B' data. The input color conversion unit 602 implemented in the ASIC 3001 processes the RGB data among the image data which has been input to the memory 3003.

At next step S5, R'G'B' data is decomposed by the color decomposition unit 603 of FIG. 4 implemented in the aforementioned ASIC 3001 into data of ink color of CMY data. The process at the next step S6 is a gamma correction process in which the CMY data is corrected to C'M'Y' data, and the S data is corrected to S' data by the gamma correction unit 604 of FIG. 4 implemented by the ASIC 3001, as has been described above. The process at step S7 is a quantization process in which the C'M'Y' data and the S' data are quantized into binary values according to dithering by the quantization unit 605 of FIG. 4 implemented by the ASIC 3001, as described above.

The process at the next step S8 is a mask setting process. The CPU 3002 reads one of the pass masks illustrated in FIGS. 11A to 11D described in the mask setting history which has been input at the preceding step S1 from the program memory 3003a of FIG. 2, and associates it with the quantized data of the S ink. In addition, the CPU 3002 associates the quantized data of C, M and Y ink with the pass mask M of FIG. 7B. The next step is a multi-pass printing process. The quantized data processed at step S7 and the pass mask associated with the quantized data at step S8 are sent to the printer engine 3004 of FIG. 2. The printer engine 3004 obtains the logical product of the quantized data and the data of the pass mask for each pixel position, as described above. To a pixel position whose result of logical product is "1", ink is ejected from a nozzle corresponding to the position. Such a process is repeatedly performed on data equivalent to one page, so as to print an image equivalent to one page.

At the next step S10, the CPU 3002 determines whether or not printing of all the pages in the print job has been completed. In the case where printing of all the pages has not been completed, the process flow returns to step S2 and image data equivalent to the next one page is input. In the case where printing of all the pages has been completed, the process flow proceeds to step S11.

The process at step S11 is an updating process of the mask setting history, in which the CPU 3002 sets the pass mask MB of FIG. 11B as the pass mask to be used in the next print job in the case where the pass mask MA of FIG. 11A has been used in the current print job. As thus described, the pass mask to be used is set repeatedly in a round-robin manner in the order of the pass masks MA, MB, MC, MD, MA, and so on, for each print job. In addition, as an alternative method, the pass masks MA, MB, MC and MD may be set at random for each print job. Furthermore, as another alternative method, the respective numbers of uses of the pass masks MA, MB, MC and MD may be accumulated, and the pass mask with the minimum number of uses may be set for each print job. The number of uses is the number of print jobs, the number of pages, the number of scan times, or the like, which have used the pass masks. After having updated the mask setting history, the mask setting history is stored in a nonvolatile memory included in the memory area of the memory 3003 of FIG. 2, and the series of processes of FIG. 12 is completed.

Banding

Next, the relation between the order of high-print-ratio passes and banding will be described. Banding is a stripe-like defect that occurs in a print image due to displacement of landing positions of ink at the boundary between passes. For example, in the case where the print ratio is high as described above, the direction of ink ejected from a nozzle near the end of the nozzle row tends to deviate during the flight of ink, which may easily result in displacement of landing positions.

Figure 13A:
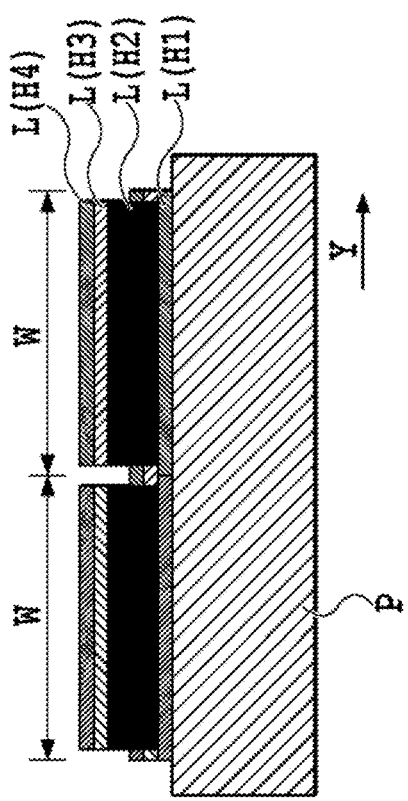
FIGS. 13A, 13B, 13C and 13D are respectively explanatory diagrams of different examples of the print result of four-pass printing.
Figure 13B:
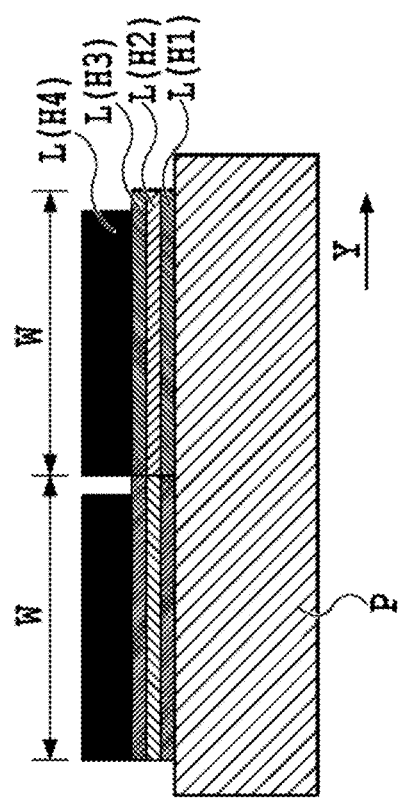
Figure 13C:
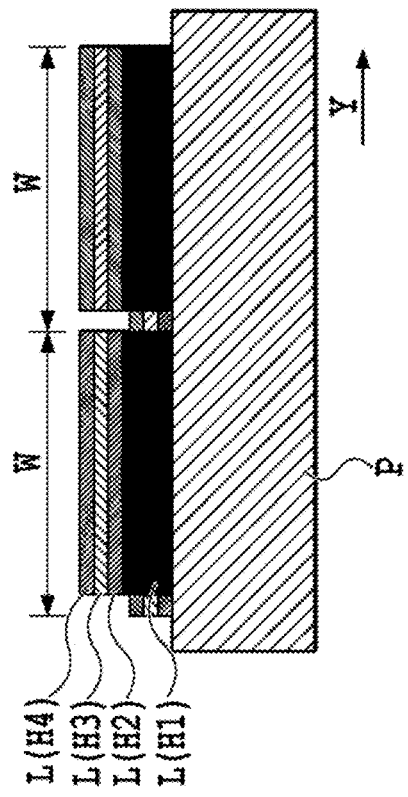

FIGS. 13A to 13D are schematic views of the case where the print medium P is subjected to printing by four passes of the S ink. The arrow Y indicates the conveying direction of the print medium P, and W indicates the print width per pass in the main scan direction. FIGS. 13A, 13B, 13C and 13D are respectively explanatory diagrams of the case where printing is performed using the pass masks of FIGS. 9A, 9B, 9C and 9D. The black layer formed on the print medium P in FIGS. 13A to 13D is a layer of silver formed by a pass with a high print ratio. In the case of FIG. 13A, a layer of silver L (H1) is formed at the first pass by the nozzle region H1 of FIG. 9A with a high print ratio, and layer of silvers L (H2), L (H3) and L (H4) are formed at the second, the third and the fourth passes by the nozzle region H2, H3 and H4 with a low print ratio. In the case of FIG. 13B, a layer of silver L (H2) is formed at the second pass by the nozzle region H2 of FIG. 9B with a high print ratio, and layer of silvers L (H1), L (H3), L (H4) are formed at the first, the third and the fourth passes by the nozzle regions H1, H3 and H4 with a low print ratio. The same goes for the cases of FIGS. 13C and 13D. In the case of FIG. 13C, a layer of silver L (H3) is formed at the third pass by the nozzle region H3 of FIG. 9C with a high print ratio, and in the case of FIG. 13D, a layer of silver L (H4) is formed at the fourth pass by the nozzle region H4 of FIG. 9D with a high print ratio.

The order of banding in terms of obtrusiveness turns out to be in the order of FIGS. 13D, 13C, 13B and 13A due to the following reason.

Figure 9B:
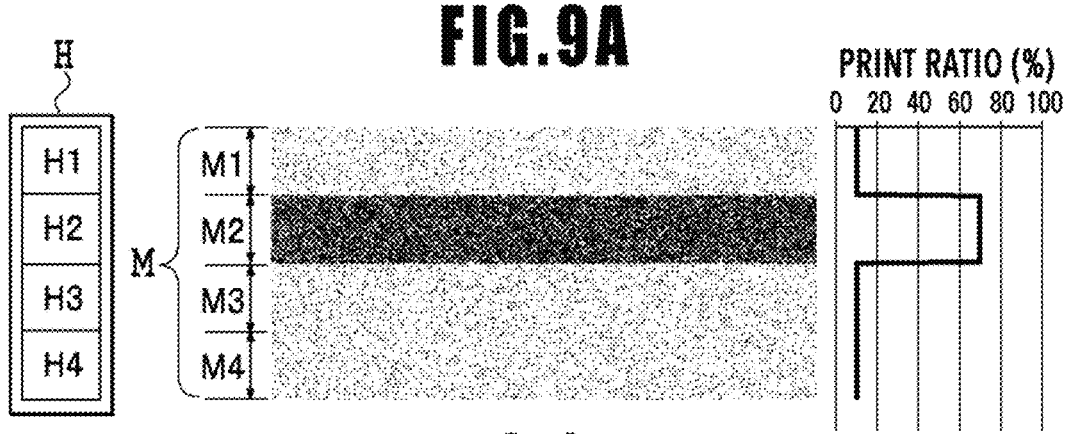
Figure 9C:
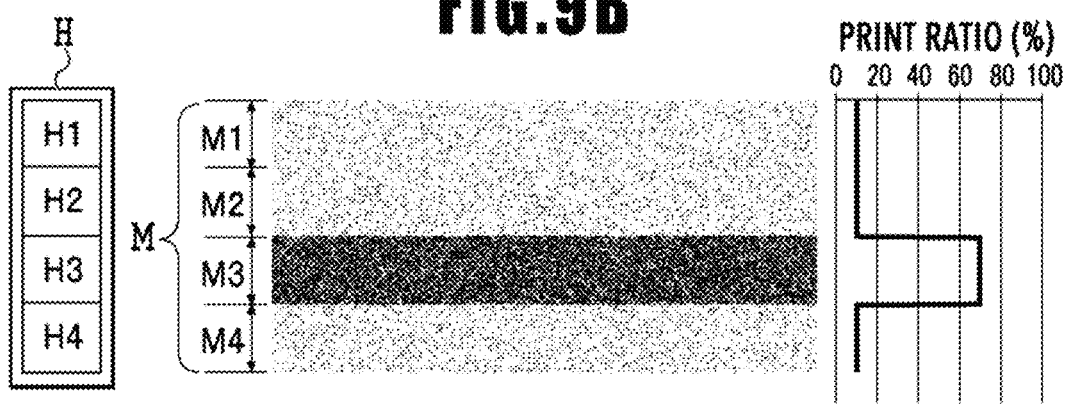
Figure 9D:
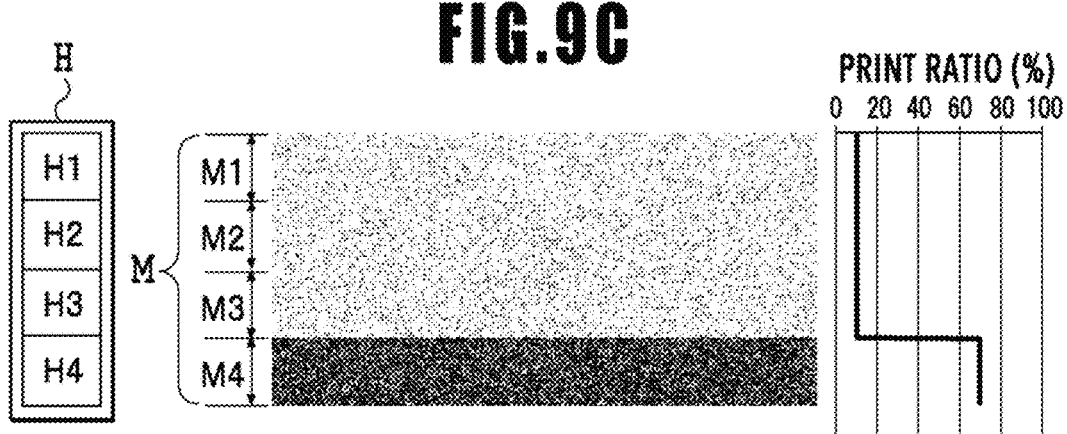
Figure 13D:
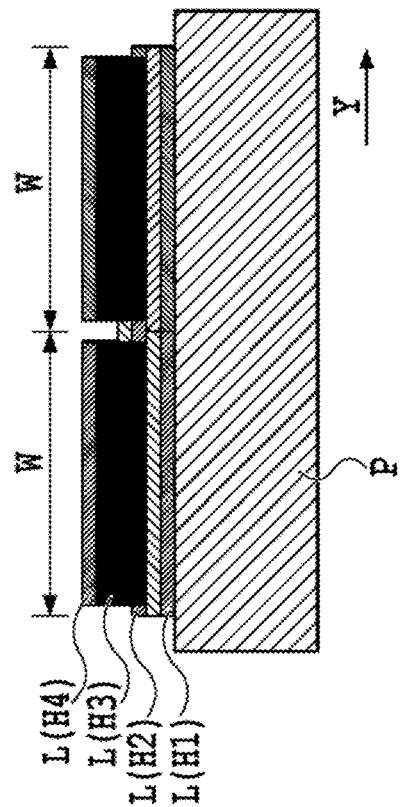

In the case of FIG. 13D, the layer of silver L (H4) with a high print ratio is formed at the fourth pass by the nozzle region H4 of FIG. 9D, and therefore the ink ejected from the nozzle at the lower part of FIG. 9D in the nozzle region H4 deviates toward the direction of nozzle region H3. As a result, as illustrated in FIG. 13D, a region with a small number of ink landings is generated in the layer of silver L (H4) with a high print ratio at the downstream side (right side in the drawing) in the conveying direction of the print medium P, and the region appears as a stripe-like defect.

On the other hand, in the case of FIG. 13A, the layer of silver L (H1) with a high print ratio is formed at the first pass by the nozzle region H1 of FIG. 9A, and therefore the ink ejected from the nozzle at the upper part of FIG. 9A in the nozzle region H1 deviates toward the direction of the nozzle region H2. As a result, as illustrated in FIG. 13A, a region with a small number of ink landings is generated in the layer of silver L (H1) with a high print ratio at the upstream side (left side in the drawing) in the conveying direction of the print medium P. However, the layer L (H1) is covered by the layers L (H2), L (H3) and L (H4) which are subsequently formed, whereby the stripe-like defect becomes less obtrusive. The number of passes forming the layer covering the layer with a high print ratio is three passes in the case of FIG. 13A, two passes in the case of FIG. 13B, one pass in the case of FIG. 13C, and 0 pass in the case of, FIG. 13D, whereby the order of banding in terms of obtrusiveness turns out to be FIGS. 13D, 13C, 13B and 13A.

Next, an example of printing a silver image by four passes using the pass masks of FIGS. 11A to 11D will be described specifically.

In the case where the pass mask MA of FIG. 11A is used, it is the same pass mask as that of FIG. 9A and therefore the layer of silver is formed as illustrated in FIG. 13A. In the case where the pass mask MB of FIG. 11B is used, the print ratio of the layer L (H2) of FIG. 13B becomes lower than the case where the pass mask of FIG. 9B is used, and the print ratio of other layers becomes high. As a result, the part corresponding to the banding in the layer L (H2) is buried by other layers, and the banding becomes less obtrusive. In the case where the pass mask MC of FIG. 11C is used, the print ratio of the layer L (H3) of FIG. 13C becomes lower than the case where the pass mask of FIG. 9C is used, and the print ratio of other layers becomes high. As a result, the part corresponding to the banding in the layer L (H3) is buried by other layers, and the banding becomes less obtrusive. In the case where the pass mask MD of FIG. 11D is used, the print ratio of layer L (H4) of FIG. 13D becomes lower than the case where the pass mask of FIG. 9D is used. Therefore, the thickness of the layer L (H4) becomes small, where displacement of ink landing positions also becomes small, making the banding less obtrusive. In the present embodiment, there has been an effect of making the banding less obtrusive by setting the print ratios of FIGS. 11A to 11D. However, it is preferred to adjust the print ratio as appropriate in accordance with the type of the S ink and the print medium to be used so as to further enhance the effect.

As has been described above, the present embodiment allows for making the banding in a silver image less obtrusive while suppressing the difference of use ratio of nozzles, by setting the high print ratio higher for a high-print-ratio pass with an earlier order, as well as changing the order of high-print-ratio passes. In addition, it is preferred to adjust the print ratio so as to print a good-quality image from both viewpoints of reducing the luster difference and making the banding less obtrusive.

Second Embodiment

A second embodiment of the present invention makes the banding further less obtrusive. FIGS. 14A to 14D are explanatory diagrams of a method thereof.

Figure 14A:
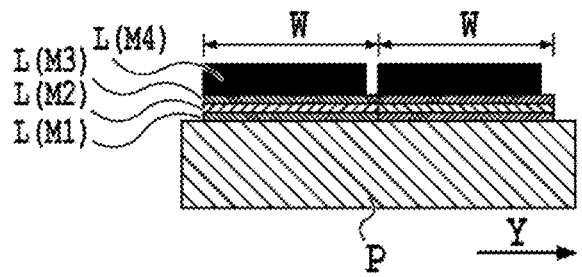
FIGS. 14A, 14B, 14C and 14D are explanatory diagrams of a pass mask and a print result for ink containing metal particles in a second embodiment of the present invention.
Figure 14B:
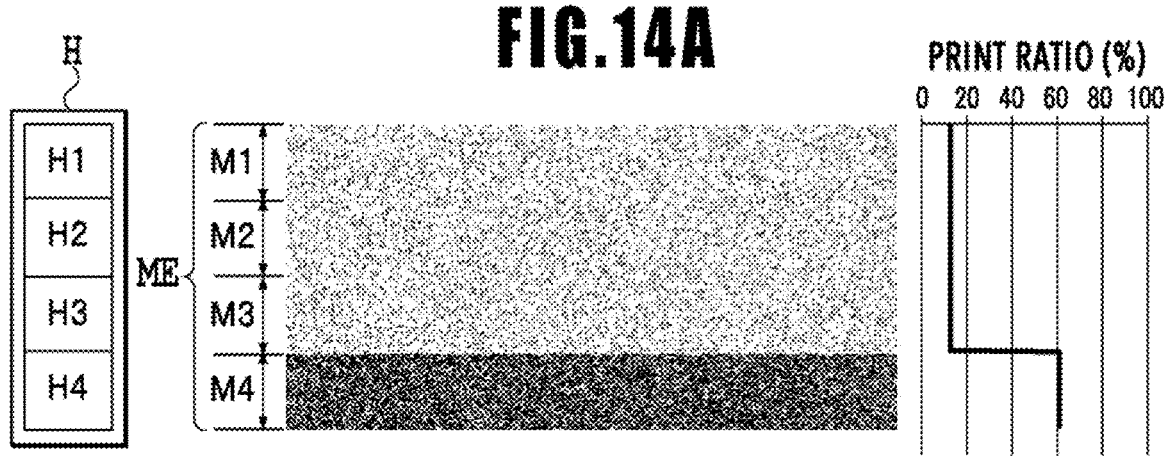
Figure 14C:
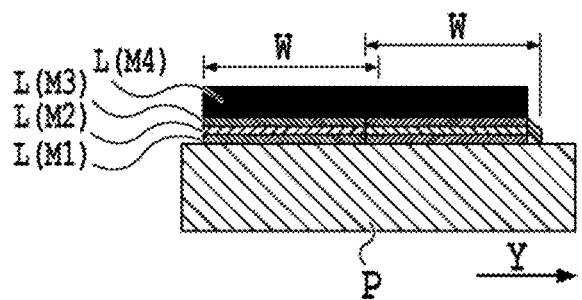

FIG. 14A is a schematic view of a layer of silver formed on the print medium P in the case where a silver image is printed by four passes using the pass mask ME of FIG. 14B. Using the mask region M4 of FIG. 14B with a high print ratio, the layer of silver L (M4) of FIG. 14A is formed. FIG. 14C is a schematic view of a layer of silver formed on the print medium P in the case where silver image is printed by four passes using the pass mask MF of FIG. 14D. Using the mask region M4 of FIG. 14D with a high print ratio, the layer of silver L (M4) of FIG. 14C is formed. In each of the pass masks ME and MF, the print ratio is about 13% for the mask regions M1, M2 and M3, whereas the print ratio is about 61% for the mask region M4. However, in the pass mask MF of FIG. 14D, print pixels are pruned in the region of eight pixels at the lower part of the drawing in the mask regions M1, M2 and M3, so that the print ratio of the region is reduced to about 12% to 5% toward the lower part of the drawing.

In the case of printing using the pass mask ME of FIG. 14B, after having performed a single print scan along with a scan of the print head H in the main scan direction, the print medium P is conveyed in the sub-scan direction by a distance equivalent to 64 nozzles, and subsequently the next print scan is performed. Repeating such an operation thereafter causes an image to be printed by four passes.

Figure 14D:
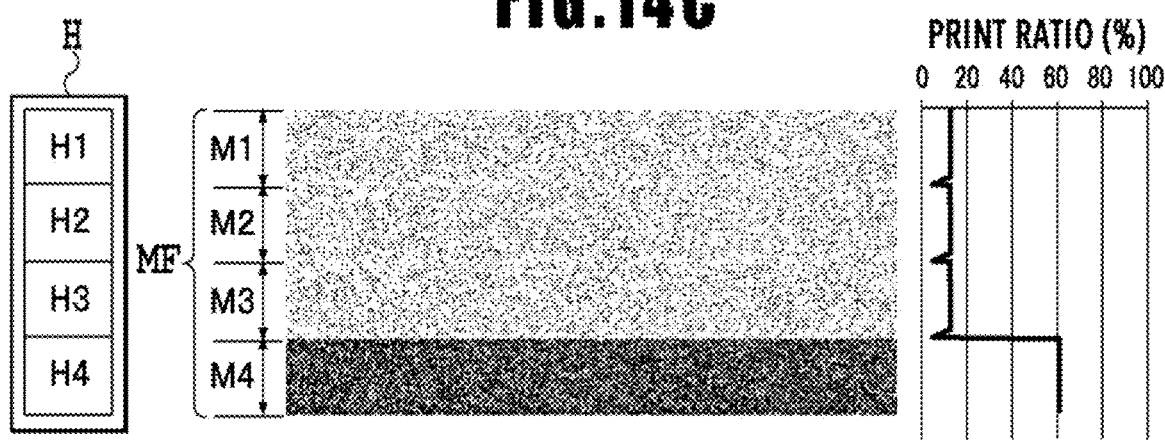

On the other hand, in the case of printing using the pass mask MF of FIG. 14D, after having performed a single print scan along with a scan of the print head H in the main scan direction, the print medium P is conveyed in the sub-scan direction by a distance equivalent to 56 nozzles, and subsequently the next print scan is performed. Repeating such an operation thereafter causes an image to be printed by four passes. As thus described, the amount of conveyance in the sub-scan direction of the print medium P in the case of using the pass mask MF of FIG. 14D is set equivalent to 56 nozzles which is smaller than the number of the sub-scan pixels in the mask region (64 nozzles). Accordingly, the boundary parts of the print regions adjacent in the sub-scan direction for each pass overlap by eight pixels, as illustrated in FIG. 14C. The number of such overlapping pixels is set as appropriate in accordance with the width in the sub-scan direction of the banding that occurs as in FIG. 14A.

As thus described, providing an overlapping region in the print region allows for the banding of the layer L (M4) corresponding to the end of the nozzle region H4 as illustrated in FIG. 14A to be buried and made less obtrusive as illustrated in FIG. 14C. Assuming a case of providing an overlapping region in a print region where the pass mask ME is used without changing the print ratio of FIG. 14B, the print ratio of the overlapping region will become high. In such a case, it is not a banding with a small number of dots formed as illustrated in FIG. 14A, but a banding with a large number of dots formed that occurs. To this end, it is effective to reduce the print ratio of the part corresponding to the overlapping region, as illustrated in FIGS. 14C and 14D, and set the amount of reduction of the print ratio so that the banding becomes less obtrusive. For example, in the case where the high-print-ratio pass is the second pass or the third pass, the banding is less obtrusive than the case where the fourth pass has a high print ratio, and therefore the overlapping region is set to include less than eight pixels. Alternatively, the amount of reduction of the print ratio may be increased with the overlapping region including eight pixels. As thus described, changing the overlapping region and varying the amount of reduction of the print ratio turn out to be changing the process of making the banding less obtrusive. It is preferred to set a smaller degree of the process of making the banding less obtrusive for a high-print-ratio pass with an earlier order, in other words, it is preferred to reduce the number of pixels in the overlapping region and set a small amount of reduction of the print ratio. As thus described, changing the print condition for the boundary part of adjacent print regions allows for making the banding less obtrusive in the silver image to be printed.

As has been described above, changing the order of high-print-ratio passes, and performing a smaller degree of banding processing for a high-print-ratio pass with an earlier order allow for making the banding less obtrusive in the silver image to be printed, while suppressing the difference of use ratio of nozzles.

Third Embodiment

In the first embodiment described above, the order of high-print-ratio passes is changed, and the high print ratio is set higher for a high-print-ratio pass with an earlier order. Accordingly, it is possible to reduce the luster difference of the printed silver image and make the banding less obtrusive, while suppressing the difference of use ratio of nozzles. A third embodiment may suppress the difference of use ratio of nozzles without changing the order of high-print-ratio passes.

FIGS. 15A to 15E are explanatory diagrams of a pass mask in the present embodiment. In the present embodiment, four-pass printing is performed using several of a total of 256 nozzles for the S ink of the print head H. In the present example, the number of the several nozzles is assumed to be 128. In four-pass printing, the width of the mask region per pass includes 32 pixels, and the number of nozzles in the nozzle region corresponding to each mask region being 32.

Figure 15A:
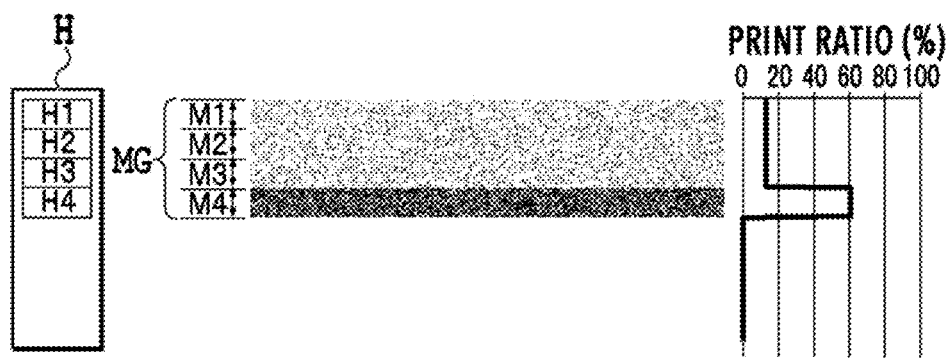
FIGS. 15A, 15B, 15C, 15D and 15E are explanatory diagrams of a pass mask for ink containing metal particles in a third embodiment of the present invention.

In the case of FIG. 15A, 128 nozzles at the upper part of the drawing are used out of a total of 256 nozzles for the S ink of the print head H. The nozzle regions H1 to H4 correspond to the mask regions M1 to M4, respectively. The print ratio of the mask regions M1, M2 and M3 is about 13%, and the print ratio of the print region M4 is about 61%. In a single print job, four-pass printing is performed by the nozzle regions H1 to H4 using the pass mask MG of FIG. 15A, in accordance with the process of FIG. 12. Upon completion of printing of all the pages in the print job, the mask setting history is updated to the pass mask MH of FIG. 15B, at step S11 of FIG. 12.

Figure 15B:
Figure 15C:
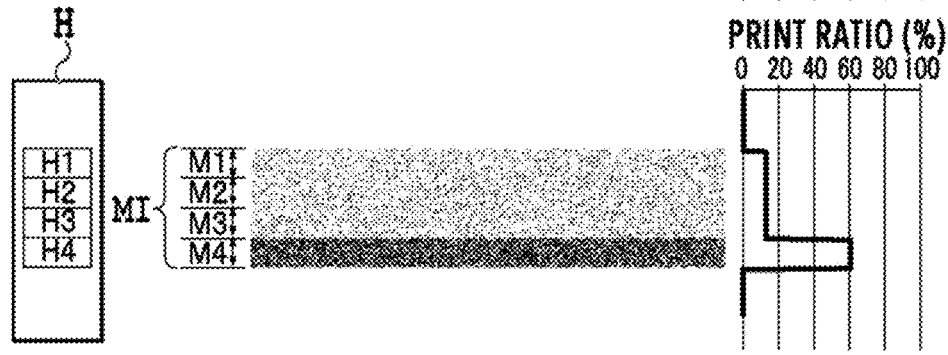
Figure 15D:
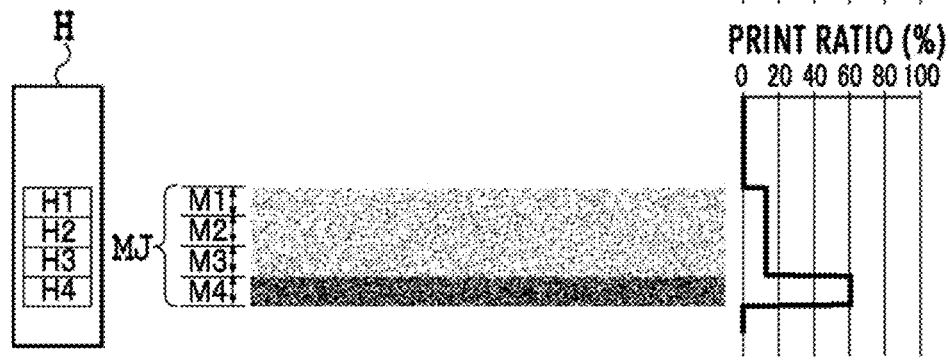
Figure 15E:
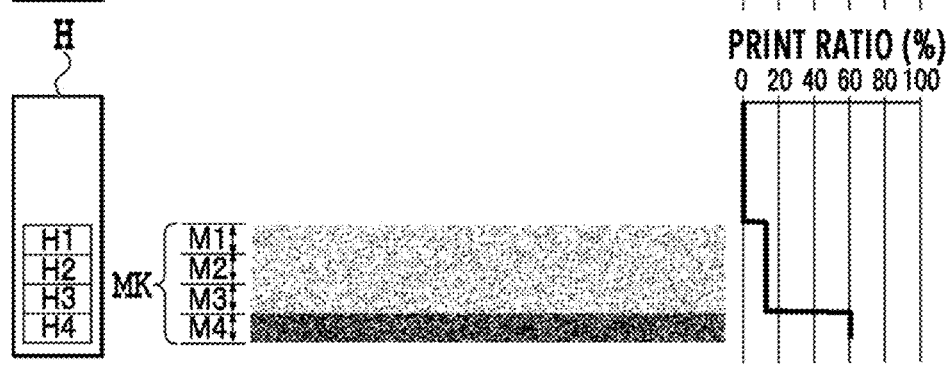
Figure 16A:
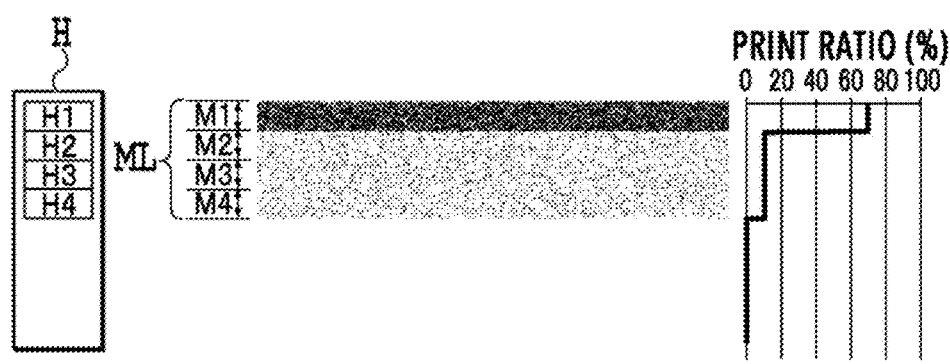
FIGS. 16A, 16B, 16C, 16D and 16E are explanatory diagrams of a pass mask for ink containing metal particles in the third embodiment of the present invention.
Figure 16B:
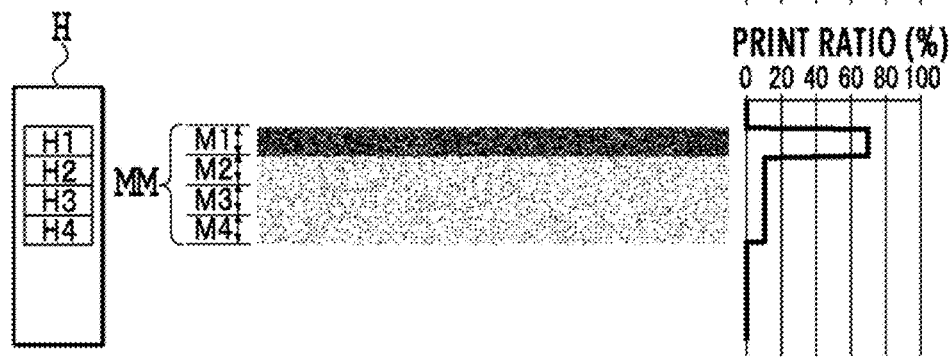
Figure 16C:
Figure 16D:
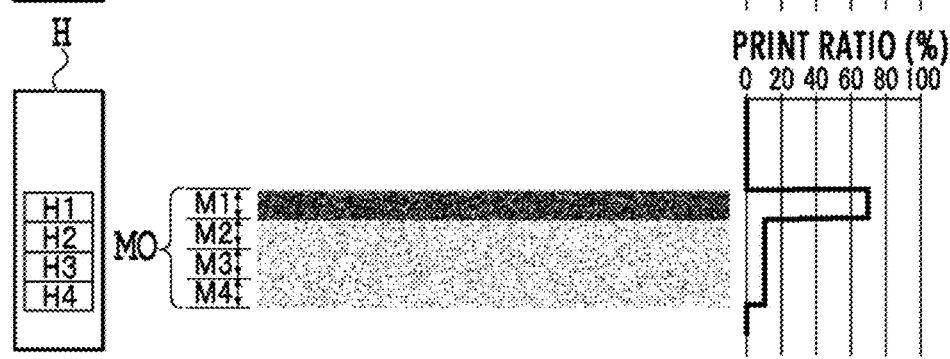
Figure 16E:
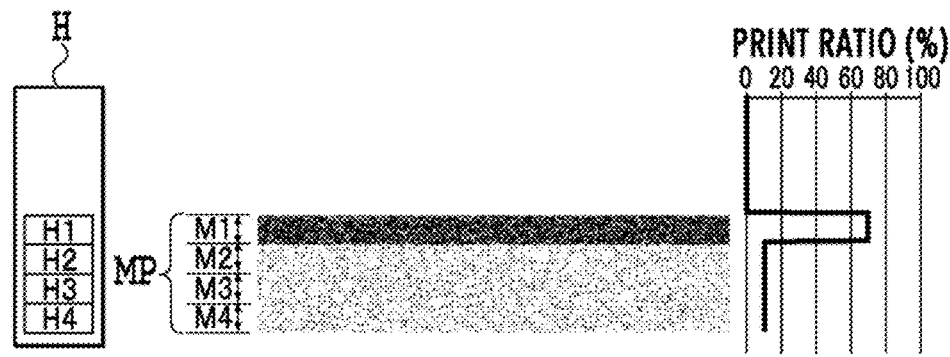

In the case of FIG. 15B, the nozzle regions H1 to H4 to be used for printing are shifted in the sub-scan direction (downward in FIG. 15B) further than the case of FIG. 15A by a distance equivalent to 32 nozzles. Similarly, in the cases of FIGS. 15C, 15D and 15E, the nozzle regions H1 to H4 to be used for printing are shifted by a distance equivalent to 32 nozzles. Each time a print job is completed, the pass masks MQ, MH, MI, MJ and MK of FIGS. 15A to 15E are repeatedly changed to the pass masks MQ, MH, MI, MJ, MK, MG MH, and so on, in a round-robin manner. Or otherwise, as an alternative method, the pass masks MG to MK may be set at random for each print job. Furthermore, as another alternative method, the respective numbers of uses of the pass masks MG to MK may be accumulated, and the pass with the minimum number of uses may be set for each print job. Such a method allows for suppressing the difference of use ratio of the 160 nozzles at the lower part of FIGS. 15A to 15E out of a total of 256 nozzles for the S ink of the print head H. In addition, the order of high-print-ratio passes is the same for the pass masks MG to MK, and therefore variation of image quality is suppressed even in the case where the nozzle use region is changed as illustrated in FIGS. 15A to 15E.

However, in the case where the nozzle use region has been changed as illustrated in FIGS. 15A to 15E, the use ratio of 96 nozzles at the upper part of the drawings decreases. Therefore, using the pass masks ML, MM, MN, MO and MP in which passes with a high print ratio precede allows for increasing the use ratio of the 96 nozzles with a low use ratio, as illustrated in FIGS. 16A to 16E. In the pass masks ML to MP, the print ratio of the mask region M1 is about 70%, and the print ratio of the mask regions M2, M3 and M4 is about 10%. In comparison with the high print ratio of 68% of the pass masks of FIGS. 15A to 15E, the high print ratio is set high, namely 70%, in FIGS. 16A to 16E in which high-print-ratio passes precede. As a result, it is possible to keep the difference of image quality due to non-uniformity of the order of high-print-ratio passes small. It is possible to use the pass masks MG to MK of FIGS. 15A to 15E and the pass masks ML to MP of FIGS. 16A to 16E in a round-robin manner, for each print job. For example, the pass masks MG to MK, ML to MP, and MG to MK are changed in a round-robin manner. In addition, as an alternative method, the pass masks MG to MK, and ML to MP may be set at random for each print job. Furthermore, as another alternative method, the respective numbers of uses of the pass masks MG to MK, and ML to MP may be accumulated, and the pass mask with the minimum number of uses may be set for each print job. The number of uses is the number of print jobs, the number of pages, the number of scan times, or the like, which have used the pass masks.

On the other hand, in the case where all of the pass masks MG to MK of FIGS. 15A to 15E and the pass masks ML to MP of FIGS. 16A to 16E are used in a round-robin manner, the use ratio of the 64 nozzles located at the center of the print head H becomes high. Therefore, using for example, the pass masks MG to MK of FIGS. 15A to 15E and the pass masks ML to MN of FIGS. 16A to 16C allows for suppressing the difference of use ratio of nozzles. The same goes for the case where the pass masks MH to MK of FIGS. 15B to 15E and the pass masks ML to MO of FIGS. 16A to 16D are used, or alternatively the case where the pass masks MI to MK of FIGS. 15C to 15E and the pass masks ML to MP of FIGS. 16A to 16E are used.

In the present embodiment, at the time of changing a part of the use region of the 256 nozzles for the S ink of the print head H, the use region is changed as a region of 128 nozzles. However, the changed use region may be smaller or larger than 128 nozzles. Note that the smaller the region, the longer the time required for printing becomes. Additionally, in the present embodiment, with 32 nozzles forming a block, although 4 successive blocks (128 nozzles) out of 8 blocks in the 256 nozzles are used, the present invention is not limited thereto. For example, with one nozzle forming a block, 128 successive blocks (128 nozzles) out of 256 blocks in 256 nozzles may be used. In addition, one out of two blocks in 256 nozzles may be used, with 128 nozzles forming a block.

Other Embodiments

In the first to the third embodiments described above, four-pass printing using the S ink has been described. However, the number of passes is not limited and, in the case where eight-pass printing is employed, for example, and the high-print-ratio pass is the first pass, the high print ratio is set to about 72% and the print ratio of other passes to about 4%. Additionally, in the case the high-print-ratio pass is the eighth pass in eight-pass printing, the high print ratio thereof is set to about 65% and the print ratio of other passes is set to about 5%. Since the high-print-ratio pass is a pass mainly aimed to exhibit metallic luster, it is preferred that even in the case where the number of passes is increased from 4 to 8, the high print ratio thereof remains at a similar level. The total of the print ratios is 100%, and the high print ratio is preferably 50% or more. In addition, since the number of nozzles of the print head is 256 in the aforementioned embodiment, it suffices in the case of eight pass printing to set the number of nozzles corresponding to each pass to 32. Furthermore, it is also possible to increase the number of passes. It suffices to assign a high print ratio, which is preferred for the pass mainly aimed to exhibit metallic luster, to a particular pass, and distribute the rest of the print ratio among other passes. On this occasion, the other print ratios excluding the high print ratio are preferably 4% or more. In a case where the high print ratio is set at 100%, a multi-pass effect cannot be obtained because strikes appear in an image. It is necessary to set the other print ratios to be equal to or larger than a predetermined ratio.

In addition, since a difference occurs in luster depending on the order of high-print-ratio passes, setting the high print ratio higher for a high-print-ratio pass with an earlier order allows for keeping the luster difference small. On the other hand, it is also possible to reduce the number of passes to two. However, three or more passes is preferable from the viewpoint of reducing image degradation due to manufacturing tolerance of nozzles. Since the number of nozzles of the print head is 256 in the embodiment described above, it suffices to set the number of nozzles corresponding to each pass to 85 in the case of three-pass printing, with one out of 256 nozzles being a non-use nozzle.

In the case where printing with a same print quality is performed using a same print medium, the high print ratio for a high-print-ratio pass with the earliest order is set equal to or higher than the high print ratio for the high-print-ratio pass with a different order, regardless of the number of passes for multi-pass printing. Additionally, in the case of printing on a certain region on a print medium, with the surface of the print medium in the region being covered with the S ink to make it invisible, covering the region with a high-print-ratio pass is preferable from the viewpoint of reducing the unevenness of the surface. In other words, the area of the layer of silver printed by the high-print-ratio pass is preferred to be equal to or larger than the area of the pixel region to be printed.

For example, let us assume a case where 11.5 pl ink is ejected from nozzles of the print head H arranged in a manner corresponding to the 600 dpi resolution, and a dot formed by the ink landing on the print medium P is circular with a radius of 30.8 μm. In such a case, the shape of the pixel region to be printed turns out to be a square, one side of which is about 42.3 μm long, corresponding to a resolution of 600 dpi. The area of the square is about 1789.29 μm$^2$. The image area of the single circular dot is about 2978.73 μm$^2$. In such a case, the high print ratio is preferred to be equal to or larger than about 60% (=1789.29/2978.73×100) so that pixel region is covered with ink.

In addition, the unevenness of the surface of the silver image may be different depending on the order of high-print-ratio passes as illustrated in FIGS. 10A and 10B, and may also be different depending on the type of the print medium. One reason is that the surface unevenness is different depending on the type of the print medium. Therefore, setting the order of high-print-ratio passes and the high print ratio thereof in accordance with the type of the print medium allows for reducing the luster, and making the banding less obtrusive. Specifically, a 3D LUT, a 1D LUT, quantization tables (dither threshold table and error diffusion threshold table), and pass mask patterns are stored in the program memory 3003*a* of FIG. 2, in association with the types of print media. Subsequently, at steps S4 to S9 of FIG. 12, the 3D LUT, the 1D LUT, the quantization tables, and the pass mask patterns are read from the program memory 3003*a* and set, in accordance with the type of the print medium to be printed.

Additionally, it has been assumed in the first to the third embodiments that the pass mask is changeable for each print job. However, the timing of change is not limited, and the pass mask may be changed for each predetermined print region (e.g., between pages in a print job, or within a page in a print job).

Figure 17:
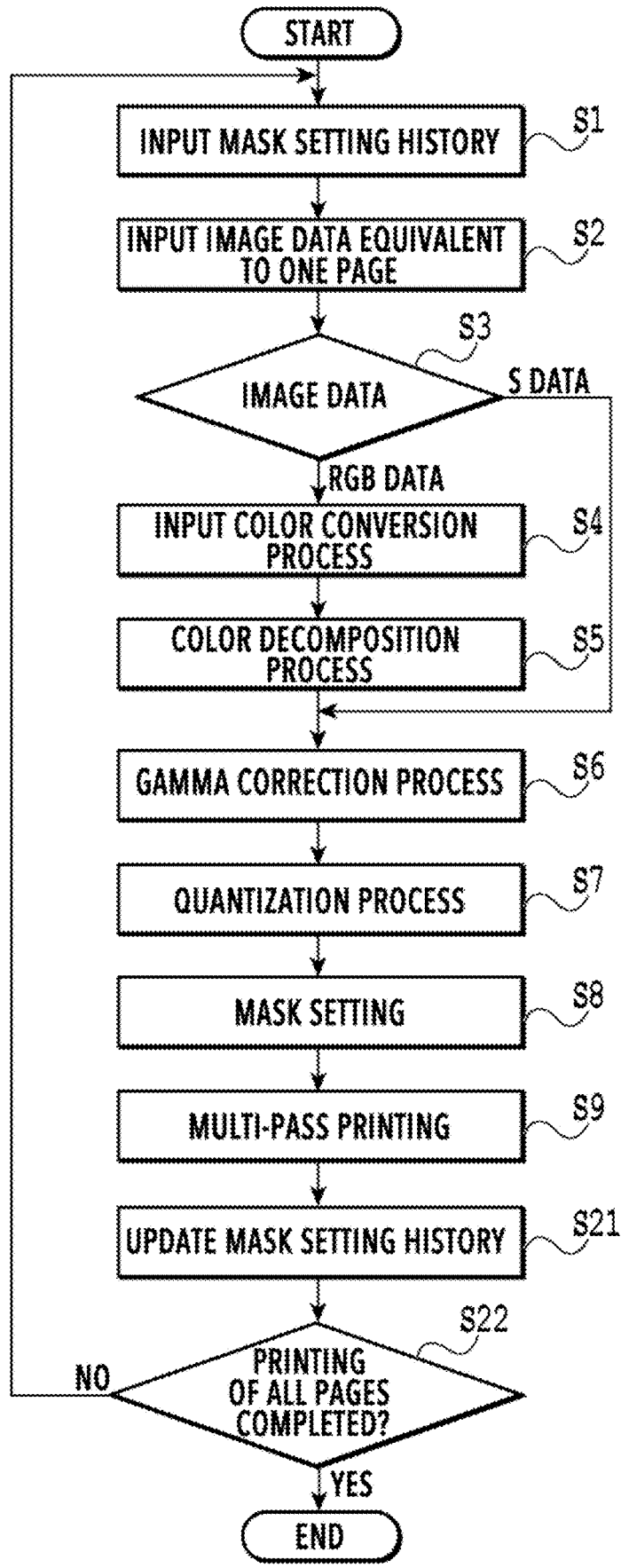
FIG. 17 is a flowchart for describing a print operation in another embodiment of the present invention.

FIG. 17 is a flowchart for describing a process of the case of changing the pass mask between pages in a print job.

Steps S1 to S9 are processes identical to steps S1 to S9 of FIG. 12 and therefore explanation is omitted. Step S21 is an updating process of the mask setting history, in which, after printing of a page has been completed, the CPU 3002 updates the history by setting a pass mask to be used for printing of the next page. For example, in the case where the pass mask MA of FIG. 11A is used in the printing of a page for which printing has been completed, the pass mask MB of FIG. 11B is set as the pass mask to be used for printing of the next page. As thus described, the pass mask to be used is set repeatedly in a round-robin manner in the order of the pass masks MA, MB, MC, MD, MA, and so on, for each page. In addition, as an alternative method, the pass masks MA, MB, MC and MD may be set at random for each page. Furthermore, as another alternative method, the respective numbers of uses of the pass masks MA, MB, MC and MD may be accumulated, and the pass mask with the minimum number of uses may be set for each page. The number of uses is the number of pages, the number of scan times, or the like, which have used the pass masks. In addition, the pass mask may be changed for each set of a plurality of pages.

At the next step S22, the CPU 3002 determines whether or not printing of all the pages in the print job has been completed. In the case where printing of all the pages has not been completed, the process flow returns to step S2 and image data equivalent to the next one page is input. In the case where printing of all the pages has been completed, the mask setting history is stored in the nonvolatile memory included in the memory area of the memory 3003 of FIG. 2, and the series of processes of FIG. 17 are completed.

Figure 18:
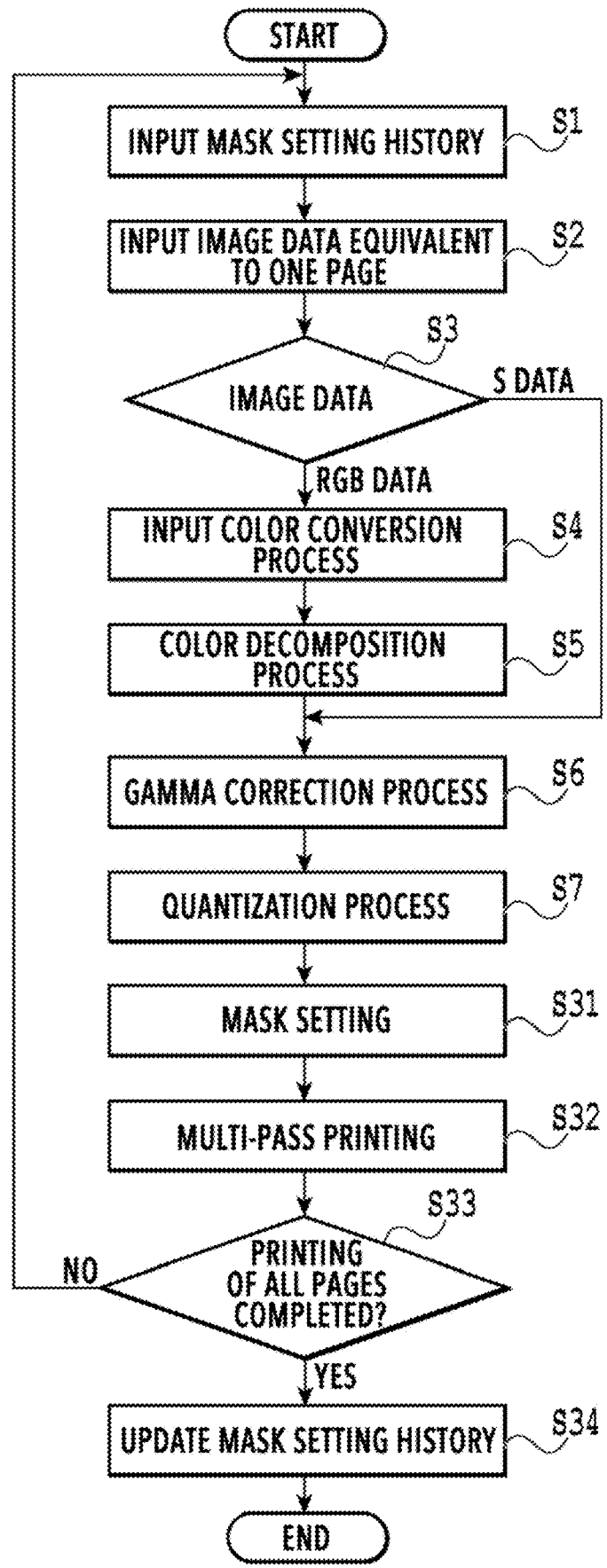
FIG. 18 is a flowchart for describing a print operation in still another embodiment of the present invention.

FIG. 18 is a flowchart for describing a process of the case of changing the pass mask within a page in print job.

Steps S1 to S7 are processes identical to steps S1 to S7 of FIG. 12 and therefore explanation is omitted. The processing at step S31 is a mask setting process. The CPU 3002 reads one of the pass masks of FIGS. 11A to 11D described in the mask setting history which has been input at the preceding step S1 from the program memory 3003a of FIG. 2, and associates it with the quantized data of the S ink (initial setting). In addition, the CPU 3002 associates the quantized data of C, M and Y ink with the pass mask of FIG. 7B. The next step is a multi-pass printing process. For each pixel position, a logical product is calculated between the quantized data processed at step S7 and the data of the pass mask associated with the quantized data at step S31. For a pixel position whose result of the logical product is "1", ink is ejected from a nozzle corresponding to the position. Such a process is repeatedly performed on the data equivalent to one page so as to print an image equivalent to one page. However, at step S31, the pass mask initially set to the S ink is changed within the page as will be described below.

At the next step S33, the CPU 3002 determines whether or not printing of all the pages in the print job has been completed. In the case where printing of all the pages has not been completed, the process flow returns to step S2 and image data equivalent to the next one page is input. In the case where printing of all the pages has been completed, the process flow proceeds to the mask setting history updating process of step S34. At step S34, the CPU 3002, having accumulated the respective numbers of uses of the pass masks MA to MD of FIGS. 11A to 11D, sets (updates the mask setting history of) the pass mask with the minimum number of uses as the pass mask for initial setting at the next iteration of step S31. Subsequently, the CPU 3002 stores the mask setting history in the nonvolatile memory included in the memory area of the memory 3003 of FIG. 2, and completes the series of processes of FIG. 18.

Next, a method of changing the pass mask in a page will be described, referring to FIGS. 5A to 5D and FIGS. 11A to 11D.

First, let us assume a case where the pass mask MA of FIG. 11A has been initialized as the pass mask for the S ink at step S31 of FIG. 18. In such a case, the nozzle region H1 of FIG. 5A and the mask region M1 of the pass mask MA are used for the first-pass printing on the region A of FIG. 5A. For the second-pass printing on the region A, the nozzle region H2 of FIG. 5A and the mask region M2 of the pass mask MA are used. For the third-pass printing on the region A, the nozzle region H3 of FIG. 5C and the mask region M3 of the pass mask MA are used. For the fourth-pass printing on the region A, the nozzle region H4 of FIG. 5D and the mask region M4 of the pass mask MA are used. Four-pass printing on the region A is completed in this manner.

For the region B of FIGS. 5B to 5D located in the same page as the aforementioned region A, the pass mask MB of FIG. 11B is used as the pass mask for the S ink. In other words, for printing on the region B, the nozzle region H1 and the mask region M1 of the pass mask MB are used in the first pass, and the nozzle region H2 and the mask region M2 of the pass mask MB are used in the second pass. Similarly, the nozzle region H3 and the mask region M3 of the pass mask MB are used in the third pass, and the nozzle region H4 and the mask region M4 of the pass mask MB are used in the fourth pass. For the region C of FIGS. 5C and 5D, four-pass printing is performed using the pass mask MC of FIG. 11C and, for the region D of FIG. 5D, four-pass printing is performed using the pass mask MD of FIG. 11D. As thus described, printing is performed with the pass mask being changed for each region equivalent to a single pass within a page. The pass mask may be set repeatedly in a round-robin manner in the order of the pass masks MA, MB, MC, MD, MA, MB, and so on, or may be set at random among the plurality of pass masks. In addition, the pass mask may be changed for each region equivalent to a set of a plurality of passes.

FIG. 19 is an explanatory diagram of the mask setting history.

A plurality of print qualities and types of pass masks are associated with each type of print medium, and the number of uses of a pass mask is stored for each of the types of pass masks. In addition, for each of the types of pass masks, it is possible to store a flag described below. The pass masks A and B are designed as appropriate in accordance with a combination of a print medium and a print quality. The number of uses to be stored may be the accumulated number of pages in which pass masks have been used, or may be the number of print jobs or the number of scan times in which pass masks have been used, described above. The flag specifies a pass mask to be used in the next iteration of the mask setting history updating process of FIGS. 12, 17 and 18. In the case of the combination of the print medium A and the print quality A of FIG. 19, the number of uses of the pass mask C is the minimum and therefore the pass mask C is specified by the flag as the pass mask to be used in the next iteration. In addition, in the case of the combination of the print medium A and the print quality B of FIG. 19, the number of uses of the pass mask A is the minimum and therefore the pass mask A is specified by the flag as the pass mask to be used in the next iteration. Similarly, in the case of the combination of the print medium B and the print quality A, the pass mask D with the minimum number of uses is specified, whereas, in the case of the combination of the print medium B and the print quality B, the pass mask B with the minimum number of uses is specified.

In the case of the combination of the print medium A and the print quality B, the numbers of uses of only the pass masks A to D are counted. The reason is because there are four types of pass masks prepared for the combination. Similarly, there are four and three types of pass masks, respectively, in the combination of the print medium B and the print quality A, and the combination of the print medium B and the print quality B. In addition, the pass mask to be used next may be set by the flag in accordance with the number of uses, may be set repeatedly in a round-robin manner, or alternatively may be set at random as described above. In FIGS. 12, 17 and 18, a pass mask provided with a flag is set as the pass mask to be use next, referring to the specified print medium and print quality, on the basis of the input mask setting history as illustrated in FIG. 19.

The present invention may be applied to other multi-pass printing, besides multi-pass printing that uses such a pass mask.

For example, the data quantized in the quantization unit 605 of FIG. 4 is randomly distributed over an image equivalent to the number of passes. In the case of increasing the print ratio of the first pass, the number of pixels equivalent to 70% of the total number of pixels are selected from random pixel positions from the quantized data, and set as the quantized data for the first pass. With regard to each of the other passes, the number of pixels equivalent to 10% are randomly selected from pixel positions not yet to be selected, and set as the quantized data for each of the other passes.

Additionally, in the case where only the minimum and the maximum values of 12 bits are included in the S' data corrected in the gamma correction unit 604 of FIG. 4, the S' data is randomly distributed over images equivalent to the number of passes. In the case of increasing the print ratio of the first pass, the number of pixels equivalent to 70% of the total number of pixels are selected from random pixel positions from the quantized data, and set as the S' data for the first pass. With regard to each of the other passes, the number of pixels equivalent to 10% are randomly selected from pixel positions not yet to be selected, and set as the S' data for each of the other passes. Subsequently, the S' data for each pass is quantized in the quantization unit 605 to generate the quantized data for each pass. To realize the randomness of pixel selection, white noise, blue noise, green noise, or the like is used. In addition, since quantized data is generated for each pass in this case, it suffices to eject ink from the print head onto pixel positions corresponding to the value "1" of the quantized data for each pass, without using the pass mask in the aforementioned embodiments.

In addition, the aforementioned embodiments, using ink having silver particles dispersed therein as metal particles with a nano-order average particle diameter, eject the ink from a print head by an inkjet printing apparatus. However, ink having dispersed therein other metal particles of a nano-order average particle diameter may be used. In addition, other color ink besides the three-color ink of C, M and Y may be used as the color ink. For example, color ink such as black (Bk), blue (Bl), green (Gr), red (Re), orange (Or), violet (Vi), or the like may be used. Furthermore, light photo ink having a hue close to that of C, M, Y, Bk, Bl, Gr, Re, Or and Vi mentioned above. In addition, the print head, which is not limited to the configuration provided with 256 nozzles corresponding to the resolution of 600 dpi, may be configured in a manner corresponding to a resolution such as 1200 dpi, for example. In addition, the number of nozzles is also not limited and may be, for example, 512 or the like. The number of nozzles to be assigned to each pass may be set in accordance with the number of multi-passes corresponding to the print quality, or the number of nozzles provided on the print head.

The present invention may also be realized by a process of supplying a program that realizes one or more functions of the aforementioned embodiments to a system or a device via a network or a storage medium, and causing one or more processors in a computer of the system or the device to read and execute the program. In addition, the present invention may also be realized by a circuit (e.g., ASIC) that realizes one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-233541 filed Dec. 5, 2017, which is hereby incorporated by reference wherein in its entirety.

What is claimed is:

1. A printing apparatus comprising:
 a print unit configured to apply ink containing metal particles;
 a scan unit configured to scan the print unit in a first direction;
 a conveyance unit configured to convey a print medium in a second direction intersecting with the first direction; and
 a control unit configured to control a print operation which causes the ink to be applied by the print unit, while causing the scan unit to scan the print unit for a predetermined number of times, which is at least two times, relative to a unit region of the print medium, in accordance with a plurality of print ratios corresponding to the predetermined number of the scans, and a conveyance operation which conveys the print medium by the conveyance unit,
 wherein the control unit can selectively execute a first print operation in which an image of the unit region is printed by the predetermined number of scans or a second print operation in which an image of the unit region is printed by the predetermined number of scans,
 wherein, in the first print operation, a print ratio of an Lth, L being an integral number, scan among the predetermined number of scans is higher than print ratios of the other scans,
 wherein, in the second print operation, a print ratio of an Nth, N>L and N being an integral number, scan among the predetermined number of scans is higher than print ratios of the other scans, and
 wherein a height of the print ratio corresponding to the Lth scan in the first print operation is higher than a height of the print ratio corresponding to the Nth scan in the second print operation.

2. The printing apparatus according to claim 1, wherein, for each of the first print operation and the second print operation, a total of print ratios of the predetermined number of scans is 100%, each of the other print ratios excluding the print ratio corresponding to the Lth scan is 4% or more in the first print operation, and each of the other print ratios excluding the print ratio corresponding to the Nth scan is 4% or more in the second print operation.

3. The printing apparatus according to claim 1, wherein, for each of the first print operation and the second print operation, a total of print ratios of the predetermined number of scans is 100%, the print ratio corresponding to the Lth scan is 50% or more in the first print operation, and the print ratio corresponding to the Nth scan is 50% or more in the second print operation.

4. The printing apparatus according to claim 1, wherein the print ratio is set by a plurality of mask pattern groups corresponding to the predetermined number of scans.

5. The printing apparatus according to claim 1, wherein the control unit controls a print operation selectively among a plurality of print operations including the first and second print operations for each print job.

6. The printing apparatus according to claim 1, wherein the control unit controls a print operation such that the first print operation is performed for a first unit region on the print medium and the second print operation is performed for a second unit region on the print medium.

7. The printing apparatus according to claim 1, wherein the control unit controls the height of the print ratio of each of the predetermined number of scans according to a performing order of the Lth scan among the predetermined number of scans.

8. The printing apparatus according to claim 7, wherein the the control unit controls the height of the print ratio of each of the predetermined number of scans such that as a performing order of the Lth scan is later among the predetermined number of scans, the print ratio of the Lth scan is lower.

9. The printing apparatus according to claim 1, wherein the print unit includes a nozzle row in which a plurality of nozzles for applying the ink are arranged in a direction which intersects with the first direction, and
the control unit is capable of changing a nozzle region in the nozzle row to be used for the print operation.

10. The printing apparatus according to claim 9 wherein the nozzle region includes a first nozzle region and a second nozzle region, and
the Lth scan in the print operation using the first nozzle region and the Lth scan in the print operation using the second nozzle region are the same scan.

11. The printing apparatus according to claim 1, wherein the metal particles are silver particles.

12. The printing apparatus according to claim 11, wherein an average particle diameter of the silver particles is from 1 to 200 nm.

13. A printing method comprising the steps of:
scanning a print unit for applying ink containing metal particles relative to a unit region of a print medium in a first direction for a plurality of times;
applying the ink from the print unit in accordance with a plurality of print ratios corresponding to the plurality of scans; and
conveying the print medium in a second direction intersecting with the first direction,
wherein a first print operation in which an image of the unit region is printed by the predetermined number of scans or a second print operation in which an image of the unit region is printed by the predetermined number of scans is selectively executed,
wherein, in the first print operation, a print ratio of an Lth, L being an integral number, scan among the predetermined number of scans is higher than print ratios of the other scans,
wherein, in the second print operation, a print ratio of an Nth, N>L and N being an integral number, scan among the predetermined number of scans is higher than print ratios of the other scans, and
wherein a height of the print ratio corresponding to the Lth scan in the first print operation is higher than a height of the print ratio corresponding to the Nth scan in the second print operation.

14. A storage medium having stored therein a program code for performing a printing method, the method comprises the steps of:
scanning a print unit for applying ink containing metal particles relative to a unit region of a print medium in a first direction for a plurality of times;
applying the ink from the print unit in accordance with a plurality of print ratios corresponding to the plurality of scans; and
conveying the print medium in a second direction intersecting with the first direction,
wherein a first print operation in which an image of the unit region is printed by the predetermined number of scans or a second print operation in which an image of the unit region is printed by the predetermined number of scans is selectively executed,
wherein, in the first print operation, a print ratio of an Lth, L being an integral number, scan among the predetermined number of scans is higher than print ratios of the other scans,
wherein, in the second print operation, a print ratio of an Nth, N>L and N being an integral number, scan among the predetermined number of scans is higher than print ratios of the other scans, and
wherein a height of the print ratio corresponding to the Lth scan in the first print operation is higher than a height of the print ratio corresponding to the Nth scan in the second print operation.

* * * * *